(12) United States Patent
Kondou et al.

(10) Patent No.: US 9,995,267 B2
(45) Date of Patent: Jun. 12, 2018

(54) IGNITION APPARATUS

(71) Applicant: DENSO CORPORATION, Kariya, Aichi-pref. (JP)

(72) Inventors: Yuuki Kondou, Kariya (JP); Masahiro Ishitani, Kariya (JP); Satoru Nakayama, Kariya (JP); Akimitsu Sugiura, Kariya (JP); Makoto Toriyama, Kariya (JP); Takashi Oono, Kariya (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 14/783,695

(22) PCT Filed: Apr. 11, 2014

(86) PCT No.: PCT/JP2014/060537
§ 371 (c)(1),
(2) Date: Oct. 9, 2015

(87) PCT Pub. No.: WO2014/168243
PCT Pub. Date: Oct. 16, 2014

(65) Prior Publication Data
US 2016/0084215 A1    Mar. 24, 2016

(30) Foreign Application Priority Data

Apr. 11, 2013  (JP) ................................. 2013-082712
Sep. 25, 2013  (JP) ................................. 2013-197976

(51) Int. Cl.
*F02P 15/08*    (2006.01)
*F02P 3/04*     (2006.01)
(Continued)

(52) U.S. Cl.
CPC ............ *F02P 15/08* (2013.01); *F02P 3/0435* (2013.01); *F02P 3/05* (2013.01); *F02P 5/15* (2013.01);
(Continued)

(58) Field of Classification Search
CPC .... F02P 15/08; F02P 15/10; F02P 3/02; F02P 3/04; F02P 3/0407; F02P 3/0414; F02P 3/0435
(Continued)

(56) References Cited

U.S. PATENT DOCUMENTS 4,136,301 A * 1/1979 Shimojo ................. F02P 15/12
                                                    123/596
4,403,592 A * 9/1983 Fritz ....................... F02P 3/051
                                                    123/609
(Continued)

FOREIGN PATENT DOCUMENTS

JP          7-229461          8/1995
JP          2000-170632       6/2000
(Continued)

OTHER PUBLICATIONS

International Search Report for PCT/JP2014/060537, dated Jul. 1, 2014, 5 pages.

*Primary Examiner* — Sizo Vilakazi
*Assistant Examiner* — Kevin R Steckbauer
(74) *Attorney, Agent, or Firm* — Nixon & Vanderhye P.C.

(57) ABSTRACT

An ignition apparatus includes an adjuster. The adjuster adjusts, according to at least one of a primary voltage and a secondary voltage detected by a voltage detector, at least one of an application timing and an application level of auxiliary electrical energy to an ignition coil while main electrical energy is applied to a spark plug by the ignition coil. The
(Continued)

application timing includes whether the auxiliary electrical energy is applied to the ignition coil.

6 Claims, 13 Drawing Sheets

(51) Int. Cl.
  *F02P 3/05* (2006.01)
  *F02P 5/15* (2006.01)
  *F02P 15/10* (2006.01)

(52) U.S. Cl.
  CPC ............ *F02P 5/1502* (2013.01); *F02P 15/10* (2013.01); *Y02T 10/46* (2013.01)

(58) Field of Classification Search
  USPC ........................................ 123/604, 620, 637
  See application file for complete search history.

(56) References Cited

U.S. PATENT DOCUMENTS

| | | | | |
|---|---|---|---|---|
| 7,798,124 | B2* | 9/2010 | Barrett | F02P 5/152 |
| | | | | 123/406.37 |
| 7,798,125 | B2* | 9/2010 | Barrett | F02P 5/1522 |
| | | | | 123/406.37 |
| 8,973,562 | B2* | 3/2015 | Tanaya | F02P 3/053 |
| | | | | 123/620 |
| 9,399,979 | B2* | 7/2016 | Heise | F02P 3/0442 |
| 2005/0000502 | A1* | 1/2005 | Waters | F02P 3/0453 |
| | | | | 123/620 |
| 2007/0181110 | A1 | 8/2007 | Toriyama et al. | |
| 2008/0078359 | A1* | 4/2008 | Barrett | F02P 5/152 |
| | | | | 123/406.37 |
| 2009/0078234 | A1* | 3/2009 | Barrett | F02P 5/1522 |
| | | | | 123/406.37 |
| 2013/0263834 | A1* | 10/2013 | Tanaya | F02P 3/053 |
| | | | | 123/623 |
| 2015/0034059 | A1* | 2/2015 | Heise | F02P 3/0442 |
| | | | | 123/622 |
| 2016/0146176 | A1* | 5/2016 | Ishitani | F02P 3/0838 |
| | | | | 123/605 |
| 2017/0117078 | A1* | 4/2017 | Kyouda | H01F 7/064 |

FOREIGN PATENT DOCUMENTS

| | | |
|---|---|---|
| JP | 2001-012339 | 1/2001 |
| JP | 2006-046241 | 2/2006 |
| JP | 2007-211631 | 8/2007 |
| JP | 2009-293474 | 12/2009 |
| JP | 2011-174471 | 9/2011 |
| JP | 2014-206068 | 10/2014 |
| JP | 2014-218995 | 11/2014 |
| JP | 2014-218997 | 11/2014 |
| JP | 2014-227960 | 12/2014 |
| JP | 2015-014237 | 1/2015 |
| JP | 2015-017544 | 1/2015 |
| JP | 2015-017562 | 1/2015 |
| JP | 2015-025397 | 2/2015 |
| WO | WO 2014/168239 | 10/2014 |
| WO | WO 2014/168244 | 10/2014 |
| WO | WO 2014/168248 | 10/2014 |
| WO | WO 2014/189064 | 11/2014 |
| WO | WO 2015-005245 | 1/2015 |
| WO | WO 2015/080270 | 6/2015 |

* cited by examiner

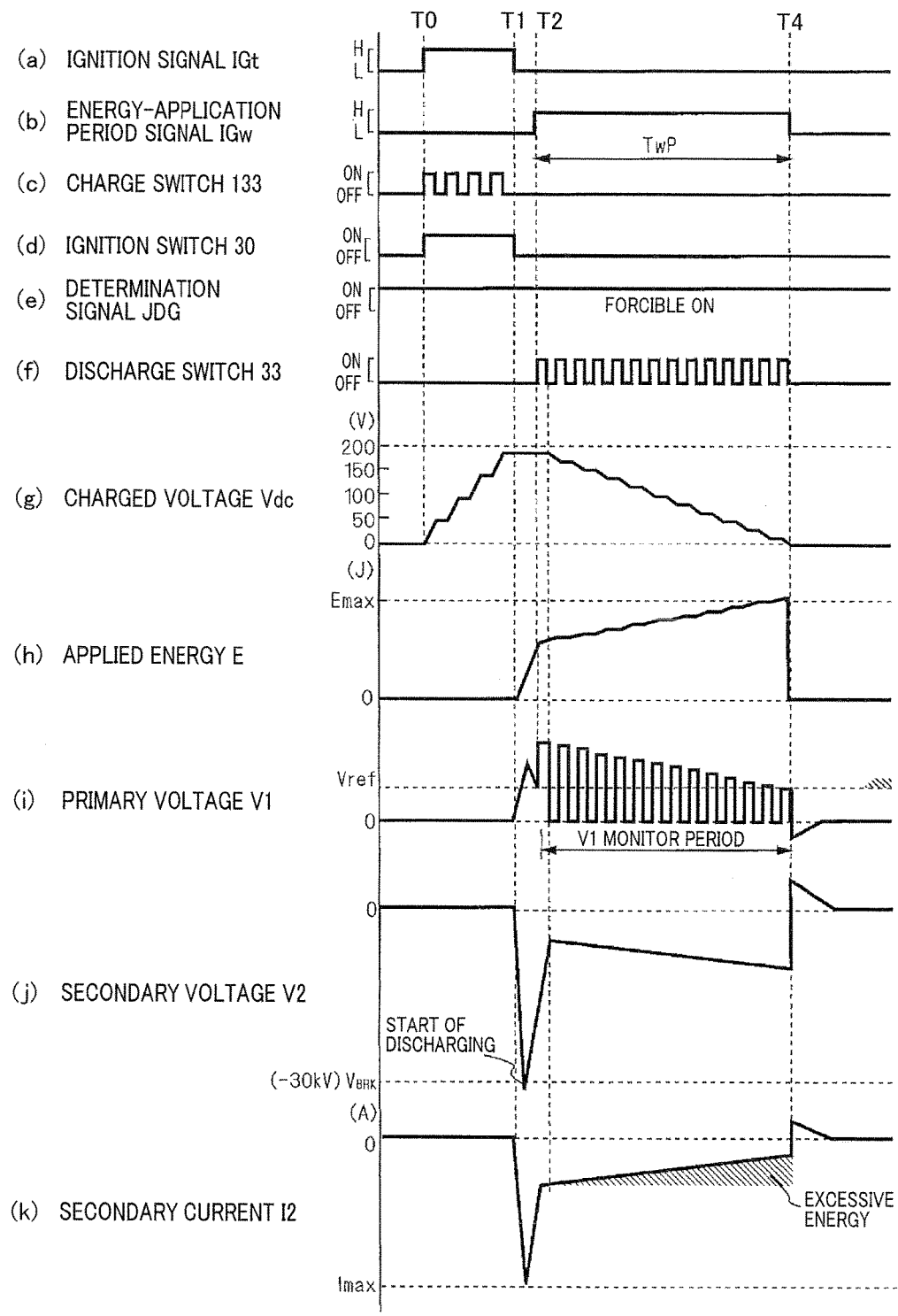

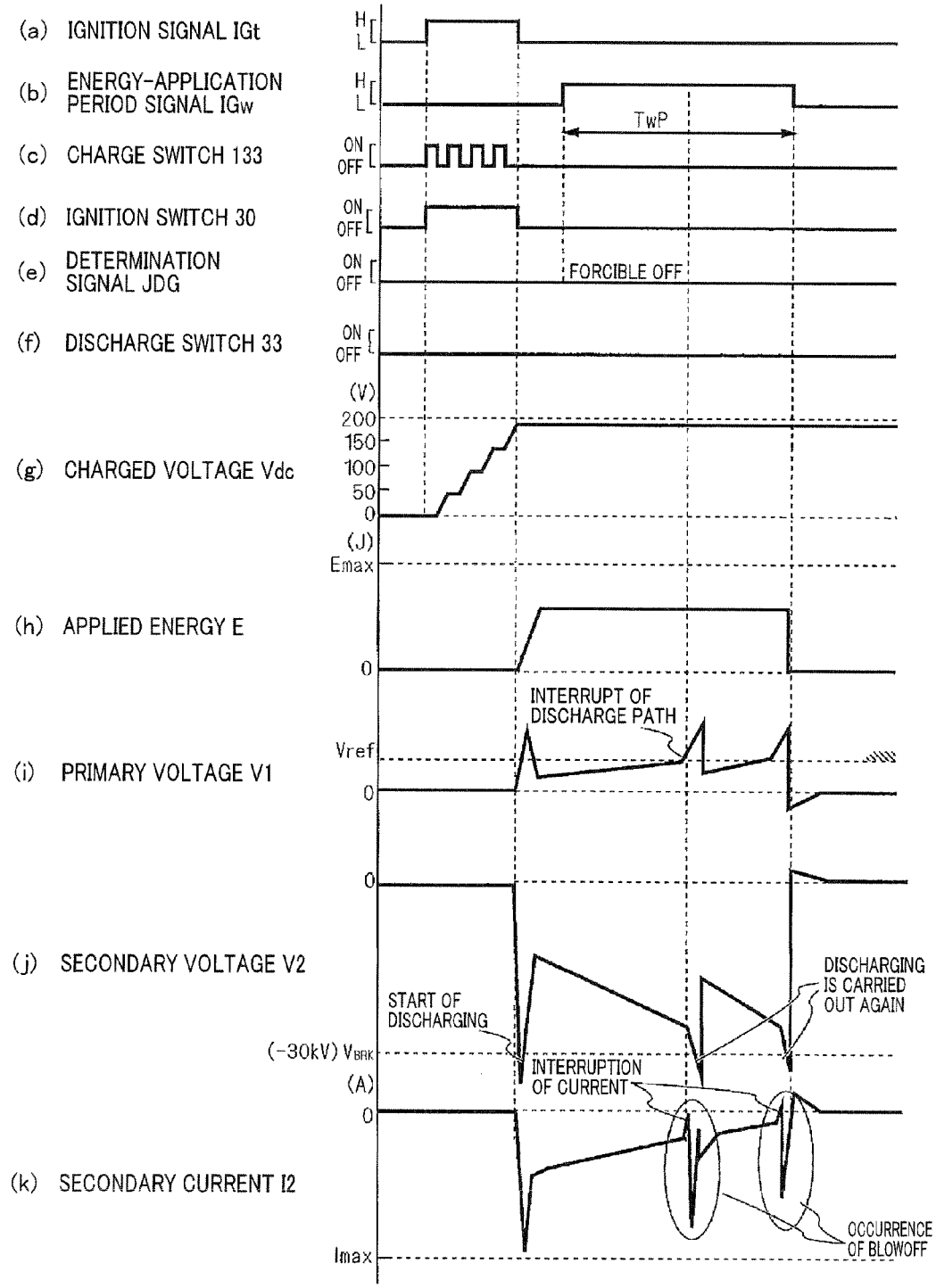

IGNITION APPARATUS

This application is the U.S. national phase of International Application No. PCT/JP2014/060537 filed 11 Apr. 2014, which designated the U.S. and claims priority to JP Patent Application Nos. 2013-082712 filed 11 Apr. 2013, and 2013-197976 filed 25 Sep. 2013, the entire contents of each of which are hereby incorporated by reference.

TECHNICAL FIELD

The present disclosure relates to ignition apparatuses for performing ignition in an internal combustion engine.

BACKGROUND ART

Spark-ignition internal combustion engines include an ignition apparatus comprised of, for example, an ignition coil that causes a spark plug to generate a discharge, so that the generated discharge causes fuel introduced in the combustion chamber of the internal combustion engine to be burned.

Proposed multiple-discharge ignition apparatuses are configured to cause the spark plug to generate plural discharges during one combustion cycle in order to improve the combustion state of fuel.

Patent document 1 discloses an example of these multiple-discharge ignition apparatuses. The ignition apparatus uses, as an ignition coil for causing a spark plug to generate discharges, an ignition coil including in combination a primary coil coupled to a storage coil, and a secondary coil coupled to the spark plug.

Specifically, the ignition apparatus repeatedly performs a task that turns on a first switch connected in series to the storage coil to charge the storage coil, and turns off the first switch to cause the storage coil to discharge.

The ignition apparatus also repeatedly performs a task that (1) Turns on a second switch connected in series to the primary coil to charge the primary coil during the discharging from the storage coil, i.e. the turn-off of the first switch, thus causing a current with a predetermined direction to flow through the spark plug via the secondary coil (2) Turns off the second switch to cause the primary coil to discharge during the charging of the storage coil, i.e. the turn-on of the first switch, thus causing a current with a direction opposite to the predetermined direction to flow through the spark plug via the secondary coil.

Specifically, the ignition apparatus alternately turns on the first switch and the second switch to cause currents respectively having different directions to alternately flow through the spark plug. This results in multiple discharges, i.e. alternating-current discharges, via the spark plug.

For example, patent document 2 discloses such a multiple-discharge ignition apparatus.

CITATION LIST

Patent Document

[Patent Document 1] Japanese Patent Application Publication No. 2007-211631
[Patent Document 2] Japanese Patent Application Publication No. 2011-174471

SUMMARY OF INVENTION

Technical Problem

The above ignition apparatus alternately turns on the first switch and the second switch to cause currents respectively having different directions to alternately flow through the spark plug, thus performing multiple discharges via the spark plug. This results in an interruption in the supply of a current to the spark plug each time one of the first and second switches is switched from the on state to the off state and the other thereof is switched from the off state to the on state.

This may cause an arc discharge generated in the spark plug to be blown off, i.e. cause a blowoff phenomenon to occur, during each current-supply interpretation in the engine environment where a strong airflow is generated in the combustion chamber.

One aspect of the present disclosure therefore seeks to provide ignition apparatuses for an internal combustion engine, which address the above problem.

Another aspect of the present disclosure seeks to provide such an ignition apparatus, which prevents blowoff of a discharge from a spark plug to maintain a stable discharge, thus causing fuel in the combustion chamber to be stably ignited.

A further aspect of the present disclosure seeks to provide an ignition apparatus, which prevents blowoff of a discharge from a spark plug while improving the energy efficiency for the spark plug and/or reducing the wearing out of the discharge electrodes of the spark plug.

Means for Solving Problem

An ignition apparatus according to an exemplary aspect of the present disclosure is to ignite, via a spark plug, fuel in a combustion chamber of an internal combustion engine according to a DC voltage supplied from a DC power supply. The ignition apparatus includes an ignition coil including a primary coil and a secondary coil. The ignition coil is configured to boost the DC voltage applied to the primary coil to generate a secondary voltage across the secondary coil, and apply the secondary voltage to the spark plug as main electrical energy, thus generating a discharge in the combustion chamber. The ignition apparatus includes at least one auxiliary power supply for applying auxiliary electrical energy to the ignition coil, and a voltage detector that detects at least one of a primary voltage generated across the primary coil and the secondary voltage. The ignition apparatus includes an adjuster that adjusts, according to at least one of the primary voltage and the secondary voltage detected by the voltage detector, at least one of an application timing and an application level of the auxiliary electrical energy to the ignition coil while the main electrical energy is applied to the spark plug by the ignition coil. The application timing includes whether the auxiliary electrical energy is applied to the ignition coil.

Advantageous Effects of Invention

The ignition apparatus according to the exemplary aspect recognizes the state of a discharge in the spark plug based on the feedback of at least one of the primary voltage and the secondary voltage detected by the voltage detector. The adjuster adjusts, according to the recognized state of the discharge in the spark plug, at least one of the application timing and the application level of the auxiliary electrical energy to the ignition coil while the main electrical energy is applied to the spark plug by the ignition coil. The application timing includes whether the auxiliary electrical energy is applied to the ignition coil.

Specifically, the above ignition apparatus enables, according to the recognized state of the discharge in the spark plug, the auxiliary electrical energy to be applied from the at least one auxiliary power supply to the ignition coil; the auxiliary electrical energy has a level needed to prevent blowoff of the discharge. The above ignition apparatus also enables stop or delay of application of the auxiliary electrical energy to the ignition coil from the at least one auxiliary power supply if it is determined, according to the recognized state of the discharge in the spark plug, that the discharge is unlikely to be blown off. This achieves improvement of energy efficiency for the spark plug and/or reduction in the wearing out of the discharge electrodes of the spark plug.

BRIEF DESCRIPTION OF DRAWINGS

FIG. 8 is a timing chart illustrating operations of an ignition apparatus according to a first comparative example of the second embodiment;

FIG. 9 is a timing chart illustrating operations of an ignition apparatus according to a second comparative example of the second embodiment;

DESCRIPTION OF EMBODIMENTS

First Embodiment

Figure 1:
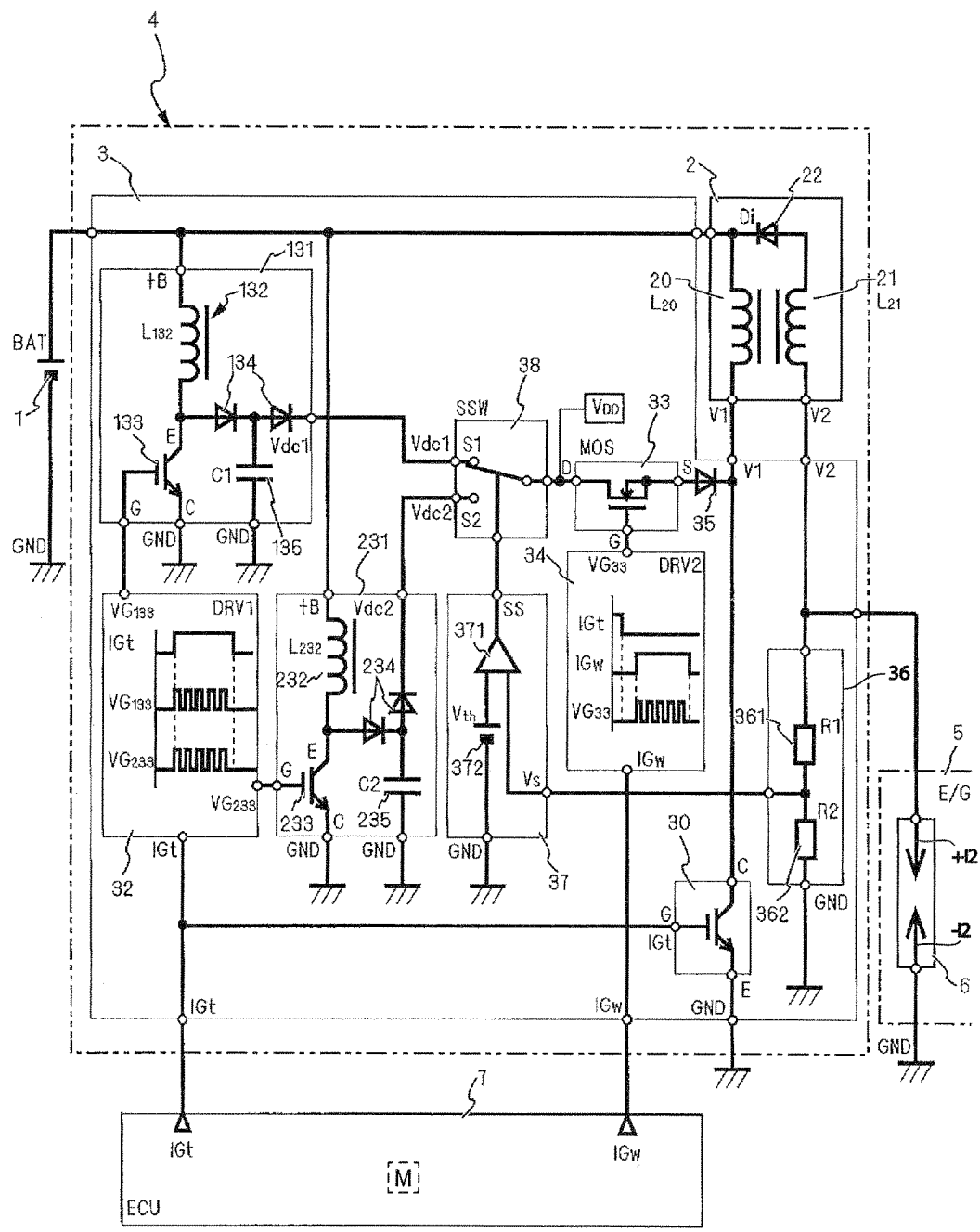
FIG. 1 is a diagram schematically illustrating an electrical structure of an ignition apparatus according to the first embodiment of the present disclosure.

The following describes a schematic structure of an ignition apparatus 4 according to the first embodiment of the present disclosure with reference to FIG. 1.

The ignition apparatus 4 according to the first embodiment causes a spark plug 6 provided in an internal combustion engine 5 to discharge, thus igniting fuel, for example air-fuel mixture, in the combustion chamber of the internal combustion engine 5. FIG. 1 schematically illustrates the internal combustion engine 5. Referring to FIG. 1, the ignition apparatus 4 includes a direct-current (DC) power supply 1, an ignition coil 2, and a control circuit 3.

The ignition coil 2 is comprised of a primary coil 20, a secondary coil 21, and a common core for the primary and secondary coils 20 and 21. The primary coil 20 is comprised of a primary winding wound around the common core with the predetermined number N1 of turns. The secondary coil 21 is comprised of a secondary winding wound around the common core with the predetermined number N2 of turns, and magnetically coupled to the primary winding. Specifically, the primary and secondary coils 20 and 21 are configured as a booster transformer having the predetermined turn ratio N equal to N2/N1.

The control circuit 3 has a function of controlling energization of the ignition coil 2 from the DC power supply 1, and discharging of the ignition coil 2 to the spark plug 6 provided in the internal combustion engine 5.

The ignition apparatus 4 configured above applies a high voltage V2 between the opposing discharge electrodes of the spark plug 6 to generate an arc discharge in the spark plug 6. The ignition apparatus 4 is characterized to apply electrical energy to the spark plug 6 superimposingly during the discharging period by the spark plug 6 to thereby maintain the discharge generated by the spark plug 6. This aims to cause fuel in the combustion chamber to be stably ignited. The following describes the specific structure of the ignition apparatus 4.

The control circuit 3 of the ignition apparatus 4 includes at least an ignition switch 30, a charge driver 32, first and second auxiliary power supplies 131 and 231, a discharge switch 33, a discharge driver 34, a rectifying element 35, a secondary voltage detector 36, a selection determiner 37, and a power-supply selecting switch 38. Note that the selection determiner 37, power-supply selection switch 38, discharge switch 33, and discharge driver 34 according to the first embodiment serve as an adjuster. The adjuster adjusts at least one of an application timing and an applied level of electrical energy from at least one of the first and second auxiliary power supplies 131 and 231 to the ignition coil 2; the application timing of electrical energy includes whether the electrical energy is applied.

The charge driver 32 is configured to perform a task to charge the first and second auxiliary power supplies 131 and 231 using the DC power supply 1.

The charge switch 33 is configured to control, under control of the discharge driver 34, electrical energy, which are supplied from the first or second auxiliary power supply 131 or 231 and used for maintaining a discharge generated by the spark plug 6.

The rectifying element 35 has a function of preventing the backflow of electrical energy from the ignition coil 2 toward the discharge switch 33.

The secondary voltage detector 36 serves to monitor, i.e. detect, a secondary voltage V2 in the ignition coil 2.

The power-supply selection switch 38 is disposed between the discharge switch 33 and each of the first and second auxiliary power supplies 131 and 231. The power-supply selection switch 38 serves as a connector that selectively connects any one of the auxiliary power supplies 131 and 231 to the discharge switch 33.

The selection determiner 37 serves to control the power-supply selection switch 38 to thereby select one of the auxiliary power supplies 131 and 231, which is to be connected to the discharge switch 33.

Referring to FIG. 1, a first end of the primary coil 20 is connected to the positive electrode of the DC power supply 1, and the discharge switch 33 is connected via the rectifying element 35, to a second end of the primary coil 20, which is opposite to the first end thereof. Specifically, electrical energy output from one of the first and second auxiliary power supplies 131 and 231, which is selected by the power-supply selection switch 38, to the ignition coil 2 is supplied to the primary coil 20 via the second end of the primary coil 20.

Note that the first embodiment shows an example provided with two auxiliary power supplies, i.e. the first and second auxiliary power supplies 131 and 231. The present disclosure can include two or more auxiliary power supplies.

An in-vehicle battery or a known DC stabilized power supply, which converts alternating-current (AC) power into DC power using, for example, regulator can be used as the DC power supply 1. The DC power supply 1 outputs a constant DC voltage +B of, for example, 12 V or 24 V. Note that a power supply, which supplies a boosted voltage using, for example, a known DC-DC converter can also be used as the DC power supply 1.

The ignition coil 2 includes a rectifying element 22 connected between the first end of the primary coil 20 and a first end of the secondary coil 21. Specifically, the first end of the primary coil 20, which is connected to the positive electrode of the DC power supply 1, is connected to the cathode of the rectifying element 22. The anode of the rectifying element 22 is connected to the first end of the secondary coil 22. The primary coil 20, the secondary coil 21, and the rectifying element 22 constitute an inductive-discharge booster transformer. A known ignition coil serving as such a booster transformer can be used as the ignition coil.

The turn ratio N, which is equal to N2/N1, of the number N2 of turns of the secondary coil 21 to the number N1 of turns of the primary coil 20 causes a voltage transformation ratio V2/V1 to be substantially identical to the turn ratio N. The voltage transformation ratio V2/V1 is defined as the ratio of the secondary voltage V2 induced across the secondary coil 21 to a primary voltage V1 induced across the primary coil 20, to be substantially identical to the turn ratio N.

A second end of the secondary coil 22, which is opposite to the first end thereof, is electrically connected to one of the opposing discharge electrodes of the spark plug 6, and the other of the opposing discharge electrodes of the spark plug 6 is connected to a ground (GND) representing a reference potential. The following describes one of the opposing discharge electrodes at the side of the ground as a negative, i.e. ground-side, discharge electrode, and the other opposite to the ground-side discharge electrode as a positive discharge electrode.

Note that the ignition coil 2 disclosed in the first embodiment can be designed as a stick ignition coil installable in a plug hole or a plug-top ignition coil installable in a housing fixed to the top of the plug hole.

A power transistor, such as an IGBT or a thyristor, is used as the ignition switch 30. The first embodiment uses for example an IGBT as the ignition switch 30. An input terminal, i.e. the collector C, of the ignition switch 30 is connected to the second end of the primary coil 20. An output terminal, i.e. the emitter E, of the ignition switch 30 is connected to a ground terminal (GND), which is a common reference potential terminal of the control circuit 3. A control terminal, such as the gate G, of the ignition switch 30 is connected to the charge driver 32 and a control unit 7. An engine control unit (ECU) 7 for controlling the internal combustion engine 5 is used as the control unit 7. Specifically, the ignition switch 30 is controlled to open or close in accordance with an ignition signal IGt sent from the ECU 7 depending on the operating conditions of the internal combustion engine 5. Note that the control unit 7 can be provided separately from the ECU 7, i.e. provided for controlling the internal combustion engine 5.

The first auxiliary power supply 131 includes a first choke coil 132, a first charge switch 133, two first rectifying elements 134, and a first capacitor 135. Similarly, the second auxiliary power supply 231 includes a second choke coil 232, a second charge switch 233, two second rectifying elements 234, and a second capacitor 235.

Coils each with a core, which respectively have predetermined inductances $L_{131}$ and $L_{232}$, are used as the first and second choke coils 132 and 232, i.e., as first and second energy-storing coils. Each of the inductances $L_{131}$ and $L_{232}$ can be set within, for example, 5 to 50 μH.

Capacitors, which respectively have predetermined capacitances $C_1$ and $C_2$, are used as the first and second capacitors 135 and 235; each of the capacitances $C_1$ and $C_2$ can be set within, for example, 100 to 1000 μF.

A power transistor, such as an IGBT or a thyristor, is used as each of the first and second charge switches 133 and 233. The first embodiment uses for example an IGBT as each of the first and second charge switches 133 and 233.

In the first auxiliary power supply 131, a first end of the first choke coil 132, which is the upstream side thereof, is connected to the positive electrode of the DC power supply 1. A second end, which is opposite to the first end, of the first choke coil 132 is connected to the input terminal (collector C) of the first charge switch 133 and to a first end of series-connected first diodes 134. The output terminal (emitter E) of the first charge switch 133 is connected to the ground terminal representing the common reference potential terminal of the control circuit 3, resulting in the downstream of the first choke coil 132 being grounded via the first charge switch 133. The charge driver 32 is connected to the control terminal (gate G) of the first charge switch 133. Specifically, the first switch 133 is configured to cause the electrical path between the DC power supply 1 and the first choke coil 132 to be openable or closable.

A second end of the series-connected first diodes 134, which is opposite to the first end, is connected to the power-supply selection switch 38. To the connection point between the series-connected first diodes 134, one end of the first capacitor 135 is connected. The other end of the first capacitor 135 is connected to the ground terminal of the control circuit 3. Note that the ground terminal of the control circuit 3 is connected to the negative electrode of the DC power supply 1.

In the second auxiliary power supply 231, a first end of the second choke coil 232, which is the upstream side thereof, is connected to the positive electrode of the DC power supply 1. A second end, which is opposite to the first end, of the second choke coil 232 is connected to the input terminal (collector C) of the second charge switch 233 and to a first end of series-connected second diodes 234. The output terminal (emitter E) of the second charge switch 233 is connected to the ground terminal representing the common reference potential terminal of the control circuit 3, resulting in the downstream of the second choke coil 232 being grounded via the second charge switch 233. The charge driver 32 is connected to the control terminal (gate G) of the second charge switch 233. Specifically, the second switch 233 is configured to cause the electrical path between the DC power supply 1 and the second choke coil 232 to be openable or closable.

A second end of the series-connected second diodes 234, which is opposite to the first end, is connected to the power-supply selection switch 38. To the connection point between the series-connected second diodes 234, one end of the second capacitor 235 is connected. The other end of the second capacitor 235 is connected to the ground terminal of the control circuit 3.

The charge driver 32 is connected to the ECU 7. The charge driver 32 generates, according to the ignition signal IGt sent from the ECU 7, pulsed gate voltage signals $VG_{133}$ and $VG_{233}$, each of which has a predetermined duty cycle, i.e. an on-off cycle. The charge driver 32 opens or closes, i.e. turns on or off, each of the first and second charge switches 133 and 233 according to a corresponding one of the pulsed gate voltage signals $VG_{133}$ and $VG_{233}$. The following refers to the respective pulsed gate voltage signals $VG_{133}$ and $VG_{233}$ as first and second charge signals $VG_{133}$ and $VG_{233}$.

Any device, which generates drive pulses using any one of various methods to open or close each of the first and second charge switches 133 and 233 according to a corresponding one of the predetermined on-off cycle under control of the ECU 7, can be used as the charge driver 32. For example, a known gate driver, such as a charge pump, can be used as the charge driver 32.

Note that the first embodiment shows that the single driver 32 opens or closes each of the first and second charge switches 133 and 233, but individual charging drives can open or close the respective first and second charge switches 133 and 233.

The first rectifying elements 134, which are two rectifying elements connected in series, prevent the backflow from the first capacitor 135 to the first choke coil 132 or the first charge switch 133. Similarly, the second rectifying elements 234, which are two rectifying elements connected in series, prevent the backflow from the second capacitor 235 to the second choke coil 232 or the second charge switch 233.

Specifically, opening or closing the first charge switch 133 causes the repetition of the supply of a current from the DC power supply 1 to the first choke coil 132 or the interruption of the current supply. This causes energy based on the supplied current to be charged in the first capacitor 135. Similarly, opening or closing the second charge switch 233 causes the repetition of the supply of a current from the DC power supply 1 to the second choke coil 232 or the interruption of the current supply. This causes energy based on the supplied current to be charged in the second capacitor 235. This results in a much higher boosted voltage Vdc1 than the voltage output from the first DC power supply 1 being charged in the first capacitor 135. The boosted value of the voltage Vdc1 is referred to as an upper limit voltage of, for example 200 V in the first embodiment.

Similarly, this results in a much higher boosted voltage Vdc2 than the voltage output from the first DC power supply 1 being charged in the second capacitor 235. The boosted value of the voltage Vdc2 is referred to as an upper limit voltage of, for example 200 V in the first embodiment.

The first and second auxiliary power supplies 131 and 231 configured above are connected in parallel to each other between the positive and negative electrodes of the DC power supply 1. The output of the first auxiliary power supply 131, i.e. the second end (Vdc1) of the series-connected first diodes 134, is connected to a first input terminal S1 of the power-supply selection switch 38. The output of the second auxiliary power supply 231, i.e. the second end (Vdc2) of the series-connected second diodes 234, is connected to a second input terminal S2 of the power-supply selection switch 38.

The power-supply selection switch 38 is connected to the selection determiner 37. The power-supply selection switch 38 switches one of the first and second input terminals S1 and S2 to be connected to its output terminal. This switching selects which of electrical energy supplied from the first auxiliary power supply 131 and electrical energy supplied from the second auxiliary power supply 231 to discharge.

The discharge switch 33 is connected to the downstream, i.e. the output, of the selection switch 38. A power transistor, such as an n-MOSFET or a FET, can be used as the discharge switch 33. The first embodiment uses a FET as the discharge switch 33. An input terminal, i.e. the drain D, of the discharge switch 33 is connected to the output terminal of the selection switch 38. An output terminal, i.e. the source S, of the discharge switch 33 is connected to the second end of the primary coil 20 of the ignition coil 2, which is the negative side of the primary coil 20 connected to the ground terminal of the control circuit 30. A control terminal, such as the gate G, of the discharge switch 33 is connected to the discharge driver 34.

A known gate driver, such as a charge pump, can be used as the discharge driver 34.

The discharge driver 34 is connected to the ECU 7. The discharge driver 34 generates, according to an energy-application period signal IGw sent from the ECU 7, a pulsed gate voltage signal $VG_{33}$ having a predetermined duty cycle, i.e. an on-off cycle. The discharge driver 34 opens or closes, i.e. turns on or off, the discharge switch 33 according to the pulsed gate voltage signal $VG_{33}$.

The secondary voltage detector 36 is connected to the second end of the secondary coil 21 of the ignition coil 2, and serves to detect the secondary voltage V2 induced across the secondary coil 21.

The first embodiment shows, as the secondary voltage detector 36, a voltage divider comprised of a first resistor 361 having a resistance R1 and a second resistor 362 having a resistance R2, which are connected in series. The present disclosure can use the secondary voltage detector 36 having a structure different from such a voltage divider.

Any structure, which is capable of detecting the secondary voltage V2 during discharging of the ignition coil 2, can be used as the secondary coil detector 36. For example, the secondary voltage divider can include one of known structures including a first structure having diode(s) or capacitor(s), a second structure having a current-sense MOSFET, and a third structure having a current mirror circuit configured to measure a secondary current I2 flowing through the spark plug 6 to calculate the secondary voltage V2 accordingly.

For example, the connection point between the first and second resistors 361 and 362 is connected to the selection determiner 37.

The selection determiner 37 reads the secondary voltage V2 measured by and fed back therefrom the secondary voltage detector 36, and compares the measured secondary voltage V2 with a predetermined threshold voltage Vth previously stored. The selection determiner 37 determines that the primary voltage V1 rises due to enlargement of an arc discharge generated in the spark plug 6 upon determination that the secondary voltage V2 is greater than the threshold voltage Vth, more precisely, the absolute value of the secondary voltage V2 is greater than the threshold voltage Vth. After the determination, the selection determiner 37 outputs a switching signal SS.

For example, the selection determiner 37 includes a comparator 371 and a power source 372 for outputting the threshold voltage Vth. A first input terminal of the comparator 371 is connected to the positive electrode of the power source 372, and a second input terminal thereof is connected to the connection point between the first resistor 361 and the second resistor 362. An output terminal of the comparator 371 is connected to the selection switch 38, and the negative electrode of the power source 372 is connected to the ground terminal of the control circuit 3.

Specifically, the comparator 371 is configured to output the switching signal SS upon determination that the secondary voltage V2 measured by the secondary voltage detector 36 and sent to the second input terminal is higher than the output voltage, i.e. threshold voltage Vth, of the power source 372. Note that the threshold voltage Vth is set to a voltage that defines a blowoff limit while the first auxiliary power supply 131 is only applying electrical energy to the ignition coil 2. The blowoff limit represents that airflow in the cylinder elongates an arc discharge generated in the spark plug 6 so that the arc discharge is blown off.

The following procedure for example determines a specific value of the threshold voltage Vth. Specifically, the spark plug 6 is provided in a pressure vessel that models an actual engine or an actual combustion chamber. Applying a high secondary voltage V2 to the spark plug 6 using the ignition coil 2 generates an arc discharge in the spark plug 6. After generation of the arc discharge, applying electrical energy from the first auxiliary power supply 131 to the spark plug 6 maintains the discharge, i.e. arc discharge, in the spark plug 6. While the discharge, i.e. arc discharge, in the spark plug 6 is maintained, a strong airflow is generated in the compression vessel to act on the arc discharge. Measuring a value of the secondary voltage V2 at the moment when the airflow blows off the arc discharge enables the measured value of the secondary voltage V2 to be determined as the threshold voltage Vth.

The primary voltage V1 at the moment when the secondary voltage V2 becomes greater than the threshold voltage Vth, which can be calculated by the equation V1=V2/N, has a relationship with respect to the voltage Vdc2 charged in the second capacitor 235 of the second auxiliary power supply 231; the relationship is expressed by the following equation:

$$V1 < Vdc2$$

The switching signal SS output from the selection determiner 37 causes the selection switch 38 to switch the connection to the output terminal from the input terminal S1 to the input terminal S2.

The connection of the input terminal S2 to the output terminal by the selection switch 38 connects the second auxiliary power supply 231 to the discharge switch 33. This causes the second auxiliary power supply 213 to apply electrical energy to the ignition coil 2. At that time, the voltage, referred to as a second discharge voltage Vdc2, output from the second auxiliary power supply 231 is configured to be much greater than the primary voltage V1. This results in discharging of electrical energy sufficient to maintain a discharge generated by the spark plug 6, thus maintaining a secondary current.

Note that the first embodiment shows an example where a specific peak of the primary voltage V1 is set to the order of several hundred volts.

The voltage Vdc1 discharged from the first capacitor 135 of the first auxiliary power supply 131 will be referred to as a first auxiliary voltage Vdc1, and the voltage Vdc2 discharged from the second capacitor 235 of the second auxiliary power supply 231 will be referred to as the second discharge voltage Vdc2. How the first auxiliary voltage Vdc1, second discharge voltage Vdc2, primary voltage V1, and secondary voltage V2 are respectively set to proper values depending on, for example, (1) The turn ratio N of the ignition coil 2
(2) The discharging gap between the discharge electrodes of the spark plug 6
(3) The combustion characteristics of the internal combustion engine 5 to which the ignition apparatus 4 is applied.

How to set the respective first auxiliary voltage Vdc1, second discharge voltage Vdc2, primary voltage V1, and secondary voltage V2 are however the matter of design, and therefore the respective first auxiliary voltage Vdc1, second discharge voltage Vdc2, primary voltage V1, and secondary voltage V2 are not limited to specific values.

The ignition apparatus 4 of the first embodiment applies, based on the output voltage of the DC power supply 1, the high secondary voltage V2 generated across the secondary coil 21 of the ignition coil 2 to the positive discharge electrode of the spark plug 6 provided for each cylinder of the internal combustion engine 5. This generates an arc discharge, i.e. an inductive discharge, between the discharge electrodes of the spark plug 6. During the inductive discharge based on the secondary coil 21, electrical energy from the first auxiliary power supply 131, i.e. electrical energy to maintain the discharge is superimposingly applied to the negative side of the primary coil 20 superimposingly in addition to the electrical energy directly supplied from the DC power supply 1. This maintains the discharge from the spark plug 6. These operations are basic operations of the ignition apparatus 4.

The ignition apparatus 4 of the first embodiment causes the power-supply selection switch 38 to switch the electrical energy to be supplied from the first auxiliary power supply 131 to the spark plug 6 from the electrical energy, i.e. the first auxiliary voltage Vdc1, output from the first auxiliary power supply 131 to the electrical energy, i.e. the second auxiliary voltage Vdc2, output from the second auxiliary power supply 231. This switching is carried out if the secondary voltage V2 measured by the secondary voltage detector 36 is greater than the predetermined threshold voltage Vth, i.e. the blowoff limit voltage Vth.

This switching enables application of the electrical energy to the negative side of the primary coil 20 to be maintained without blowoff of the arc discharge generated in the spark plug 6.

In addition, the ignition apparatus 4 of the first embodiment switches the source for supplying electrical energy to the spark plug 6 from the first auxiliary power supply 131 to the second auxiliary power supply 231 upon determination that the switching is required based on the measured secondary voltage V2. This prevents the wearing out of the discharge electrodes of the spark plug 6 due to application of excessive energy.

Note that the control circuit 3 can be designed as a semiconductor integrated circuit. If necessary, the control circuit 3 can be comprised of, for example, a board, capacitors mounted on the board, and coils mounted on the board, and can be installed in an unillustrated housing together with the ignition coil 2.

Figure 2:
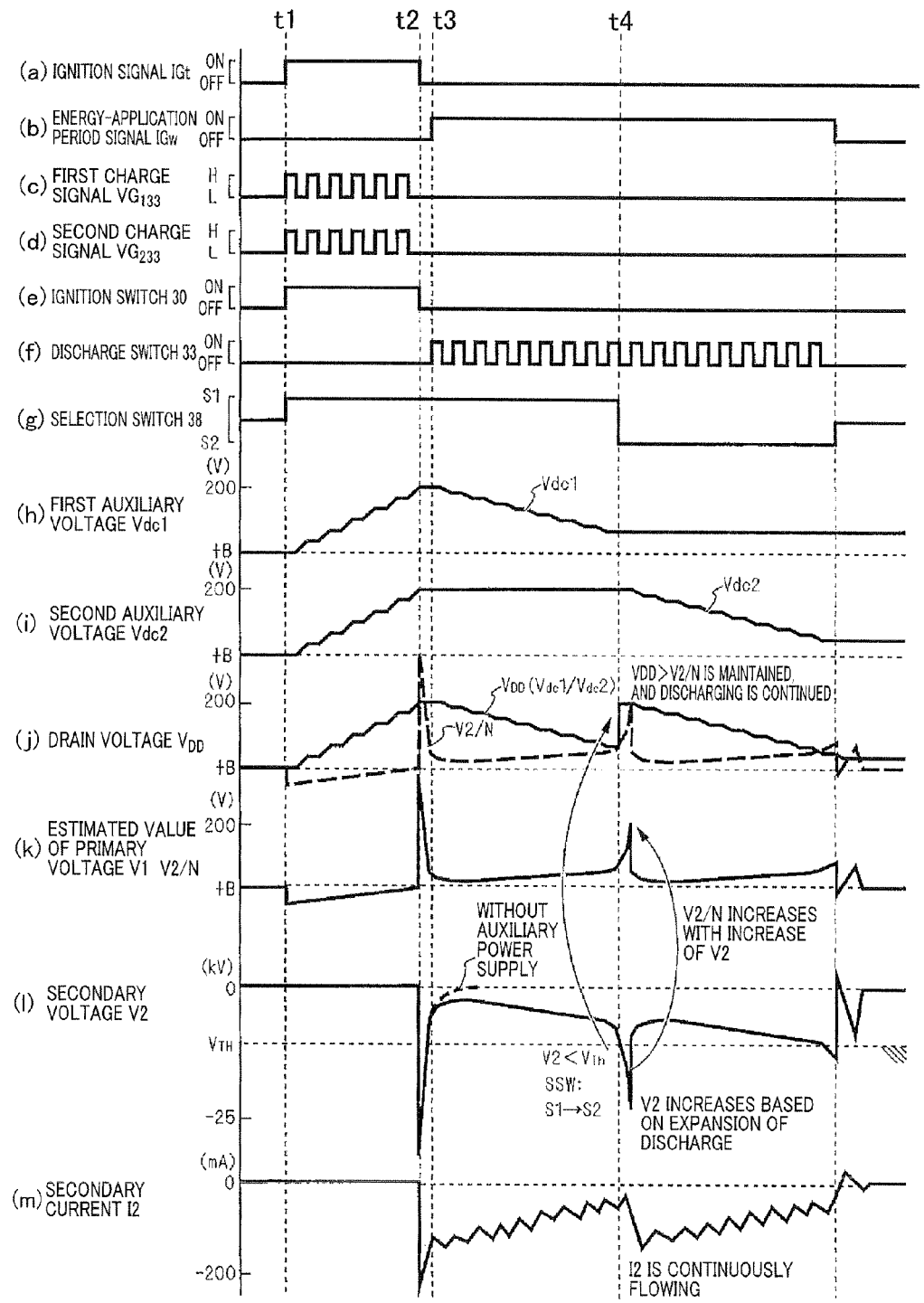
FIG. 2 is a timing chart illustrating operations of the ignition apparatus illustrated in FIG. 1.

The following describes basic operations of the ignition apparatus 4 of the first embodiment and advantages based on the basic operations with reference to FIG. 2.

(a) of FIG. 2 illustrates the ignition signal IGt sent from the ECU 7, and (b) of FIG. 2 illustrates the energy-application period signal IGw. (c) of FIG. 2 illustrates the first charge signal $VG_{133}$ for opening or closing the first charge switch 133, and (d) of FIG. 2 illustrates the second charge signal $VG_{233}$ for opening or closing the second charge switch 233.

Figure 7:
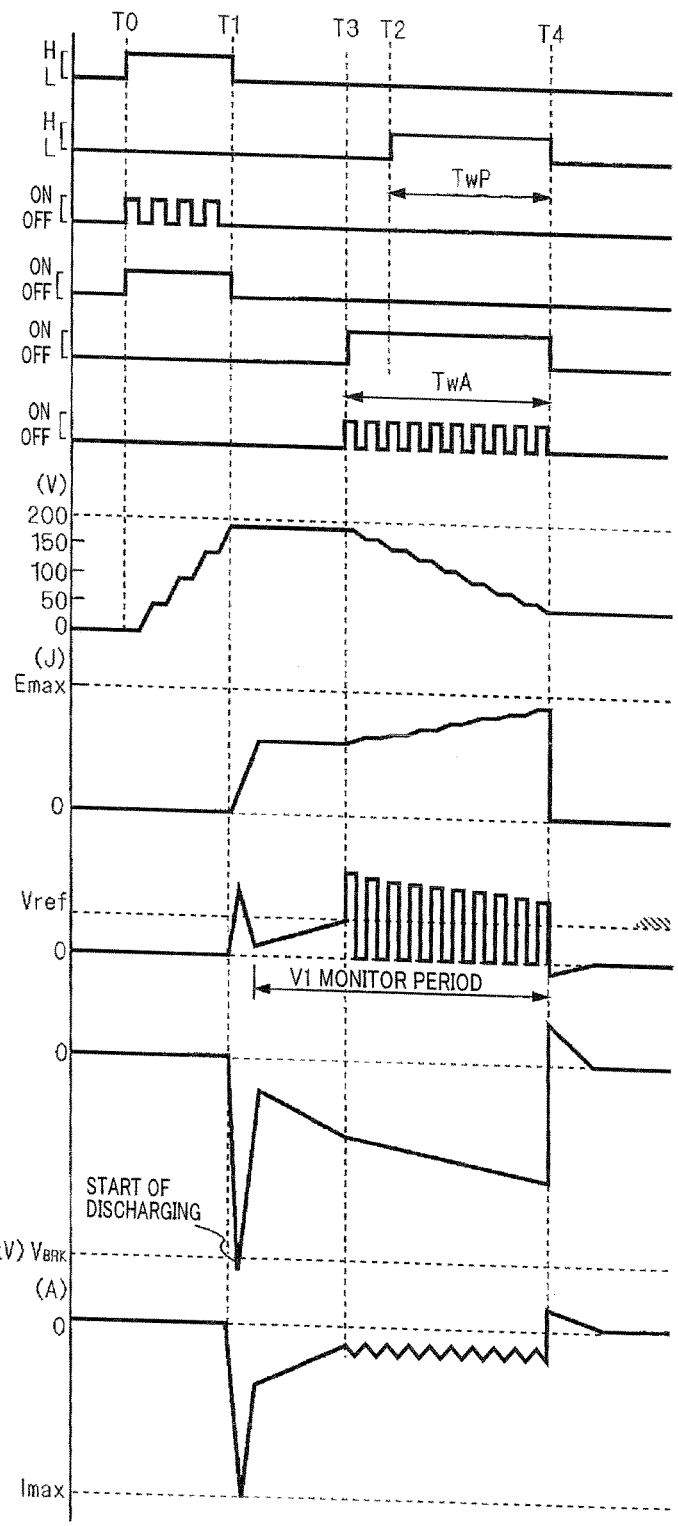
FIG. 7 is a timing chart illustrating operations of the ignition apparatus illustrated in FIG. 5 if there is a strong airflow in the combustion chamber as a second situation.

In addition, (e) of FIG. 2 illustrates how the ignition switch 30 is opened or closed, i.e. turned off or on, and (f) of FIG. 2 illustrates how the discharge switch 33 is opened or closed, i.e. turned off or on. (g) of FIG. 2 illustrates how the power-supply selection switch 38 is switched, (h) of FIG. 7 illustrates how the first auxiliary voltage Vdc1 changes, and (i) of FIG. 2 illustrates how the second auxiliary voltage Vdc2 changes. (j) of FIG. 2 superimposingly illustrates how the drain voltage $V_{DD}$ of the discharge switch 33 and the generated primary voltage V2/N change. (k) of FIG. 2 illustrates how the primary voltage V1=V2/N, which is estimated based on the secondary voltage V2, changes. (l) of FIG. 2 illustrates how the secondary voltage V2 changes, and (m) of FIG. 2 illustrates how the secondary current I2 flowing through the secondary coil 21 changes.

Note that the timing chart illustrated in FIG. 2 of the first embodiment is an example, and schematically illustrates the above parameters. How the parameters change is unlimited to the example of the timing chart, which is similarly applied for the following other embodiments.

Note that it is possible to measure the primary voltage V1 itself at the negative side, i.e. the second terminal side, of the primary coil 20 illustrated in FIG. 1.

In this case, the potential at the second terminal T (V1) of the primary coil 20 becomes equal to any one of the first auxiliary voltage Vdc1 across the first capacitor 135 and the second auxiliary voltage Vdc2 across the second capacitor 235 upon the discharge switch 33 being on and the drain voltage $V_{DD}$ is higher than the primary voltage V1 generated across the primary coil 20. On the other hand, the potential at the second terminal T (V1) of the primary coil 20 is detected as a value equal to the voltage V2/N generated across the primary coil 20 upon the discharge switch 33 being on and the primary voltage V1 generated across the primary coil 20 is higher than the drain voltage $V_{DD}$. Reference character N represents the turn ratio.

The first embodiment has no illustration of how the primary voltage V1 itself changes as the generated primary voltage of the ignition coil 2 illustrated in (j) and (k) of FIG. 2, but illustrates how the value V2/N determined based on the secondary voltage V2 changes as the generated primary voltage of the ignition coil 2 illustrated in (j) and (k) of FIG. 2

(a) of FIG. 2 illustrates that the ignition signal IGt according to the ignition timing of the internal combustion engine 5 is sent from the ECU 7 to the charge driver 32 and the ignition switch 30 (see time t1). For example, the ignition signal IGt, which is a pulse signal having a width matching with the ignition timing and the ignition period, is sent from the ECU 7 to the charge driver 32 and the ignition switch 30. The ignition signal, i.e. the pulse signal, IGt rises up from a low level (L) to a high level (H) at the time t1.

(b) of FIG. 2 illustrates that the energy-application period signal IGw, which has a pulse width matching with a predetermined period, is sent from the ECU 7 to the discharge driver 34 according to the operating conditions of the internal combustion engine 5 after, for example, the end timing of the ignition signal IGt (see time t2). Specifically, the energy-application period signal, i.e. the pulse signal, IGw rises up from the low level (L) to the high level (H) at the time t3.

Note that the rising timing and the pulse width of the energy-application period signal IGw sent from the ECU 7, i.e. the electrical-energy application timing and application period from the first auxiliary power supply 131, according to the first embodiment are previously determined as variables in a map M; the variables are represented as a function of, for example, a plurality of parameters indicative of the operating conditions of the internal combustion engine 5. Specifically, the ECU 7 extracts, from the map M, values of the rising timing and the pulse width of the energy-application period signal IGw, which match with values of the parameters at the time t3. Then, the ECU 7 determines the energy-application period signal IGw according to the extracted values of the rising timing and the pulse width of the energy-application period signal IGw.

(c) and (d) of FIG. 2 illustrate that the charge driver 32 outputs, to the respective first and second charge switches 133 and 233, the first and second charge signals $VG_{133}$ and $VG_{233}$ each having the predetermined on-off cycle in response to, i.e. in synchronization with, the rising edge of the ignition signal IGt. This results in start of charging of the first and second capacitors 135 and 235 in response to the rising edge of the ignition signal IGt.

This causes each of the first and second charge switches 133 and 233 to open or close, i.e. be turned on or off, according to the on-off cycle of a corresponding one of the first and second charge signals $VG_{133}$ and $VG_{233}$. (c) and (d) of FIG. 2 illustrate that the output of the first and second charge signals $VG_{133}$ and $VG_{233}$ from the charge driver 32 is stopped in response to, i.e. in synchronization with, the falling edge of the ignition signal IGt. (c) and (d) of FIG. 2 illustrate that the high and low levels of each of the first and second charge signals $VG_{133}$ and $VG_{233}$ correspond to on and off.

Note that charging of the first and second capacitors 135 and 235 is not necessarily limited to match with the on period of the ignition signal IGt according to the first embodiment. For example, it is possible to send the charge signal IGt having a predetermined length to the charge driver 32 at a predetermined timing, thus charging the first and second capacitors 135 and 235. This charging is carried out during the off period of the energy-application period signal IGw if this charging enables sufficient energy to be discharged during the on period, i.e. the discharging period, of the energy-application period signal IGw.

The open and close operations, i.e. the on and off operations, of each of the first and second charge switches 133 and 233 according to the ignition signal IGt with the discharge switch 33 opened, i.e. off, cause electrical energy stored in the first choke coil 132 from the DC power supply 1 to be repeatedly charged in the first capacitor 135 (see (h) and (i) of FIG. 2). This results in the boosting of the first and second auxiliary voltages Vdc1 and Vdc2 charged in the respective first and second capacitors 135 and 235 from the first and second auxiliary power supplies 131 and 231.

(e) of FIG. 2 illustrates that the ignition switch 30 is turned on, i.e. closed, in synchronization with the rising edge of the ignition signal IGt (see the time t1), and the ignition switch 30 is turned off, i.e. opened, in synchronization with the falling edge of the ignition switch 30 (see the time t2).

The opening, i.e. turn-off, of the ignition switch 30 interrupts the primary current flowing through the primary coil 20, causing self-induction to generate induced electromotive force, i.e. a primary voltage, V1 across the primary coil 20 as illustrated in (k) of FIG. 2. Thus, mutual induction generates induced electromotive force, i.e. a much higher secondary voltage, V2 within, for example, the range from −20 kV to −50 kV inclusive across the secondary coil 21, which shares the core with the primary coil 20 as illustrated in (l) of FIG. 2. Note that the polarity of the secondary voltage V2 is defined such that the positive electrode side of the DC power supply 1 is positive, i.e. plus (+), and the negative electrode side is negative, i.e. minus (−).

At that time, the secondary voltage V2 is N times higher than the primary voltage V1 where N is equal to N2/N1.

Note that the following embodiments including the first embodiment describes that high and low and/or up and down of the secondary voltage V2 means high and low and/or up and down of the unsigned value, i.e. the absolute value, of the secondary voltage V2 unless otherwise noted. For example, −50 kV of the secondary voltage V2 is higher than −20 kV of the secondary voltage V2, and when the secondary voltage V2 changes from −50 kV to −20 kV, this means that the secondary voltage V2 drops from −50 kV to −20 kV.

The secondary voltage V2 generated set forth above is applied to the positive discharge electrode of the spark plug 6. This results in a spark discharge, i.e. an arc discharge, between the discharge electrodes of the spark plug 6 when the secondary voltage V2 is greater than a predetermined withstand voltage in the discharge space between the discharge electrodes of the spark plug 6. Thus, a large secondary current I2 is flowing instantaneously via the secondary coil 21 (see (m) of FIG. 2). Note that the sign of the secondary current I2 is positive, i.e. +I2, when the secondary current I2 is flowing from the positive discharge electrode to the negative discharge electrode of the spark plug 6 in FIG. 2. The sign of the secondary current I2 is also negative, i.e. −I2, when the secondary current I2 is flowing from the negative discharge electrode to the positive discharge electrode of the spark plug 6 in FIG. 2.

The start of discharging from the spark plug 6 reduces the secondary voltage V2, resulting in reduction of the primary voltage V1.

After the start of discharging from the spark plug 6, the energy-application period signal IGw rises up at a predetermined timing (see time t3) when the discharge current I2 becomes small as illustrated in (b) of FIG. 2.

As illustrated in (f) of FIG. 2, the discharge driver 34 causes the discharge switch 34 to open or close, i.e. to be turned on or off, in response to, i.e. in synchronization with, the rising of the energy-application period signal IGw.

On the other hand, (g) of FIG. 2 illustrates that, in the power-supply selection switch 38, the first input terminal S1 is connected to the output terminal as an initial state in synchronization with the rising edge of the ignition signal IGt (see the time t1). As illustrated in (f) of FIG. 2, open and close operations, i.e. on and off operations, of the discharge switch 33 while the first and second charge switches 133 and 233 and the ignition switch 30 are all off (see the time t2) causes the first auxiliary voltage Vdc1 from the first auxiliary power supply 131 to be applied to the negative side of the primary coil 20 of the ignition coil 2 according to the voltage charged in the first capacitor 135. This results in continuous supply of the primary current to the primary coil 20 (see after the time t3).

Specifically, on-off operations of the discharge switch 33 cause the first capacitor 135 to be cyclically discharged as illustrated in (h) of FIG. 2, resulting in the first auxiliary voltage Vdc1 gradually decreasing.

The electrical energy applied to the negative side of the primary coil 20 from the first capacitor 135 causes the primary voltage V1, which has risen instantaneously and has fallen thereafter, to be maintained at a level higher than the DC voltage +B, resulting in the primary current continuously flowing through the primary coil 20.

Consequently, the mutual induction of the primary and secondary coils 20 and 21 enables the secondary voltage V2, which is the product of the turn ratio and the primary voltage V1, to change from a lower level to a level according to the change of the primary voltage V1. The level to which the secondary voltage V2 is changed is kept to maintain the discharge with change of the primary voltage V1 as illustrated in (l) of FIG. 2, thus resulting in the secondary current I2 continuously flowing. Specifically, if the electrical energy from the first auxiliary power supply 131 was not applied to the primary coil 20 of the ignition coil 2, the secondary voltage V2 might decrease as illustrated by a dashed line of (l) of FIG. 2.

However, the first embodiment applies the electrical energy from the first auxiliary power supply 131 and the DC voltage +B to the primary coil 20 superimposingly, causing the secondary voltage V2 to be kept at a level that maintains a discharge in the spark plug 6.

This results in the supply of the secondary current I2 to the spark plug 6 being maintained as illustrated in (m) of FIG. 2, enabling a discharge in the spark plug 6 to be maintained.

The first embodiment applies the first auxiliary voltage Vdc1 based on the first auxiliary power supply 131 to the negative side, i.e. the second end, of the primary coil 20 of the ignition coil 2. This causes the level of the applied electrical energy to be lower than the level of the electrical energy applied to the positive side, i.e. the first end, of the primary coil 20. This is because applying electrical energy to the positive side, i.e. the first end, of the primary coil 20 needs the electrical energy whose level is higher than the DC voltage +B from the DC power supply 1.

The secondary voltage detector 36 monitors the secondary voltage V2 applied to the spark plug 6. The selection determiner 37 determines, based on the monitored results, whether the monitored secondary voltage V2 is greater than the predetermined threshold voltage Vth.

At that time, let us assume that airflow in the combustion chamber of each cylinder extends an arc discharge generated by the corresponding spark plug 6. The extending arc discharge relatively expands the discharge distance, resulting in an increase of the secondary voltage V2.

The increase of the secondary voltage V2 results in the secondary voltage V2 becoming greater than the predetermined threshold voltage Vth representing the blowoff limit according to the increase of the secondary voltage V2 as illustrated in (I) of FIG. 2. This enables the selection determiner 37 to detect that the primary voltage V1 is approaching the drain voltage $V_{DD}$ of the discharge switch 33, i.e. the first auxiliary voltage Vdc1. This results in the selection switch 37 outputting the switching signal SS to the power-supply selection switch 38. The switching signal SS causes the selection switch 38 to switch the connection to the output terminal from the input terminal S1 to the input terminal S2 (see time t4).

Note that the secondary voltage V2 is a negative value according to the first embodiment set forth above. For this reason, if the selection determiner 37 directly handles the secondary voltage V2 without using its absolute value, the threshold voltage Vth is set to be a negative value. When the secondary voltage V2 further becomes lower than the threshold voltage Vth, that is, the relationship is expressed as −V2<−Vth, the power-supply selection switch 38 switches the connection to its output terminal from the first terminal S1 to the second terminal S2.

The switching operation of the power-supply selection switch 38 causes the drain voltage $V_{DD}$ of the discharge switch 33 to be switched from the first auxiliary voltage Vdc1, which is decreasing due to the discharging, to the second auxiliary voltage Vdc2 higher than the first auxiliary voltage Vdc1.

Specifically, (k) and (l) of FIG. 2 illustrate that the enlargement of the arc discharge increases the secondary voltage V2, so that the primary voltage V1 increases in proportion to the increase of the secondary voltage V2. This results in the discharging to the primary coil 20 of the ignition coil 2 being switched from the first auxiliary power supply 131 to the second auxiliary power supply 231 when the primary voltage V1 becomes close to the first auxiliary voltage Vdc1 as illustrated in (j) of FIG. 2.

As described above, when the second auxiliary voltage Vdc2 is higher than the threshold voltage Vth, the second auxiliary voltage Vdc2 is set to be higher than a value of the primary voltage V1 at which the second auxiliary voltage Vdc2 is higher than the threshold voltage Vth as illustrated in (j) of FIG. 2. For this reason, the opening or closing of the discharge switch 33 enables the supply of the electrical energy based on the second capacitor 233 to the spark plug 6 to be maintained without interruption of the discharge path from the second capacitor 233 to the spark plug 6.

This results in the secondary current I2 being supplied to the spark plug 6 over a long time, thus maintaining the arc discharge generated in the spark plug 6. This enables the fuel in the combustion chamber to be stably ignited, in other words, a flame kernel based on the fuel to be stably grown.

Figure 3:
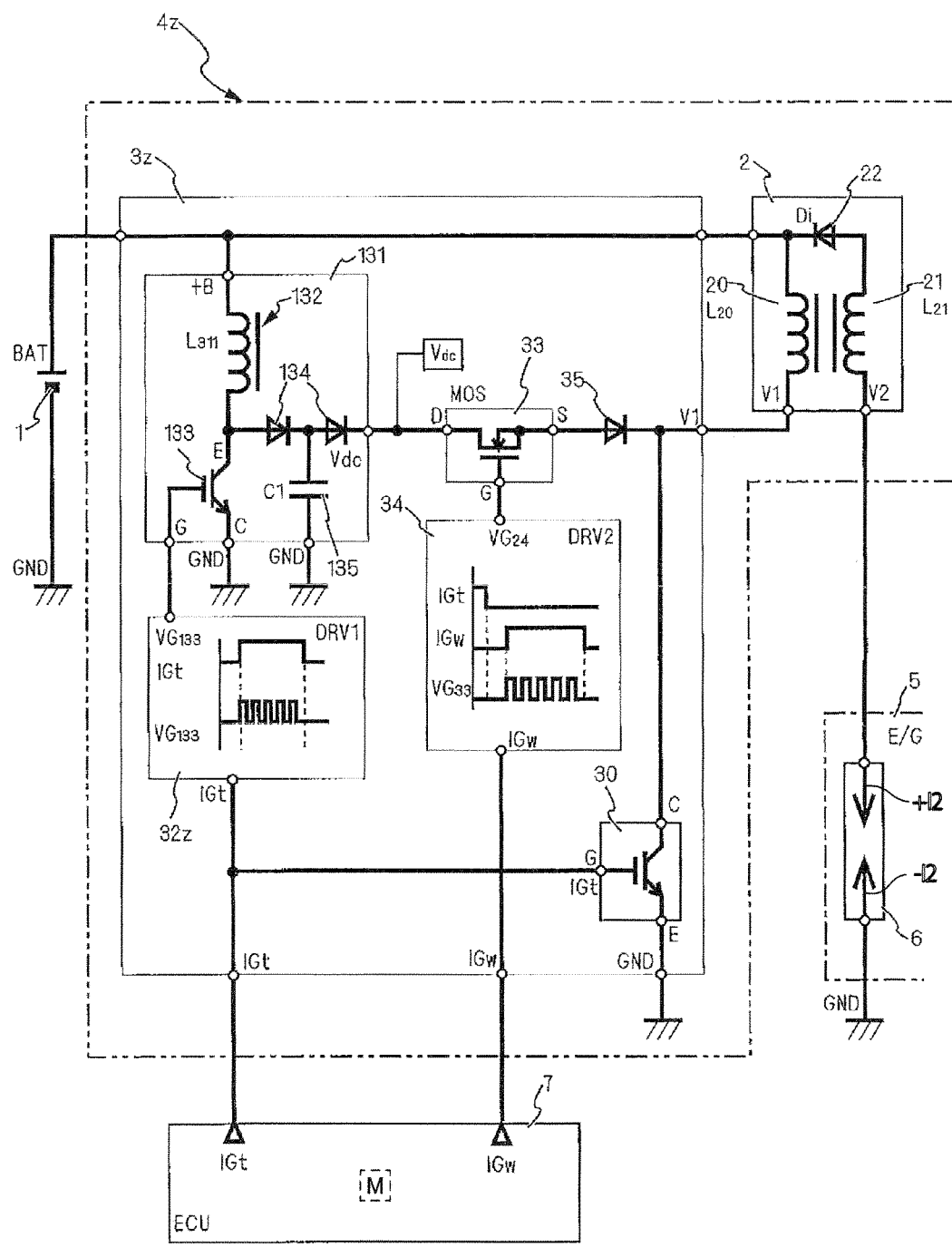
FIG. 3 is a diagram illustrating a schematic structure of an ignition apparatus according to a comparative example of the first embodiment.
Figure 4:
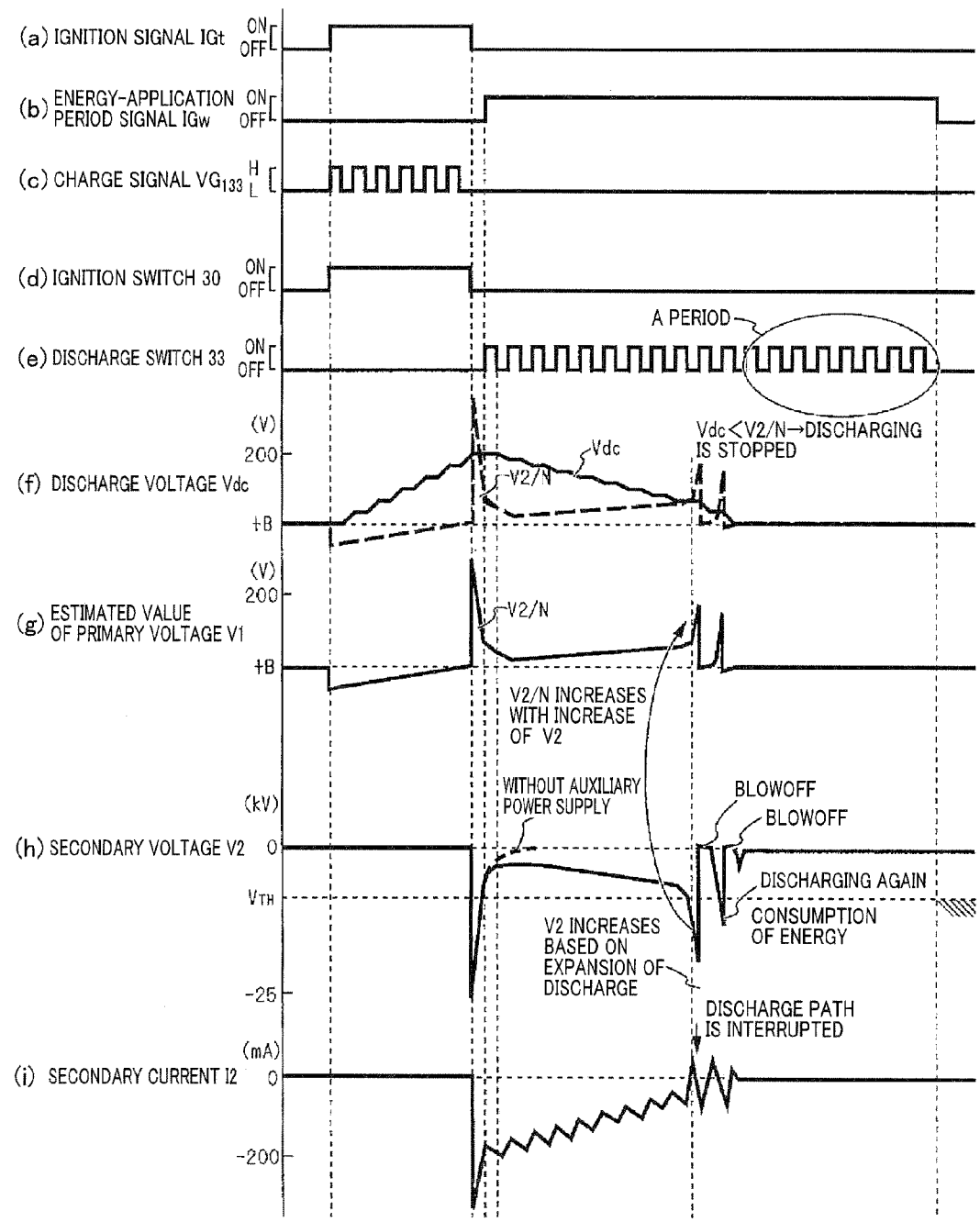
FIG. 4 is a timing chart illustrating operations of the ignition apparatus illustrated in FIG. 3.
Figure 5:
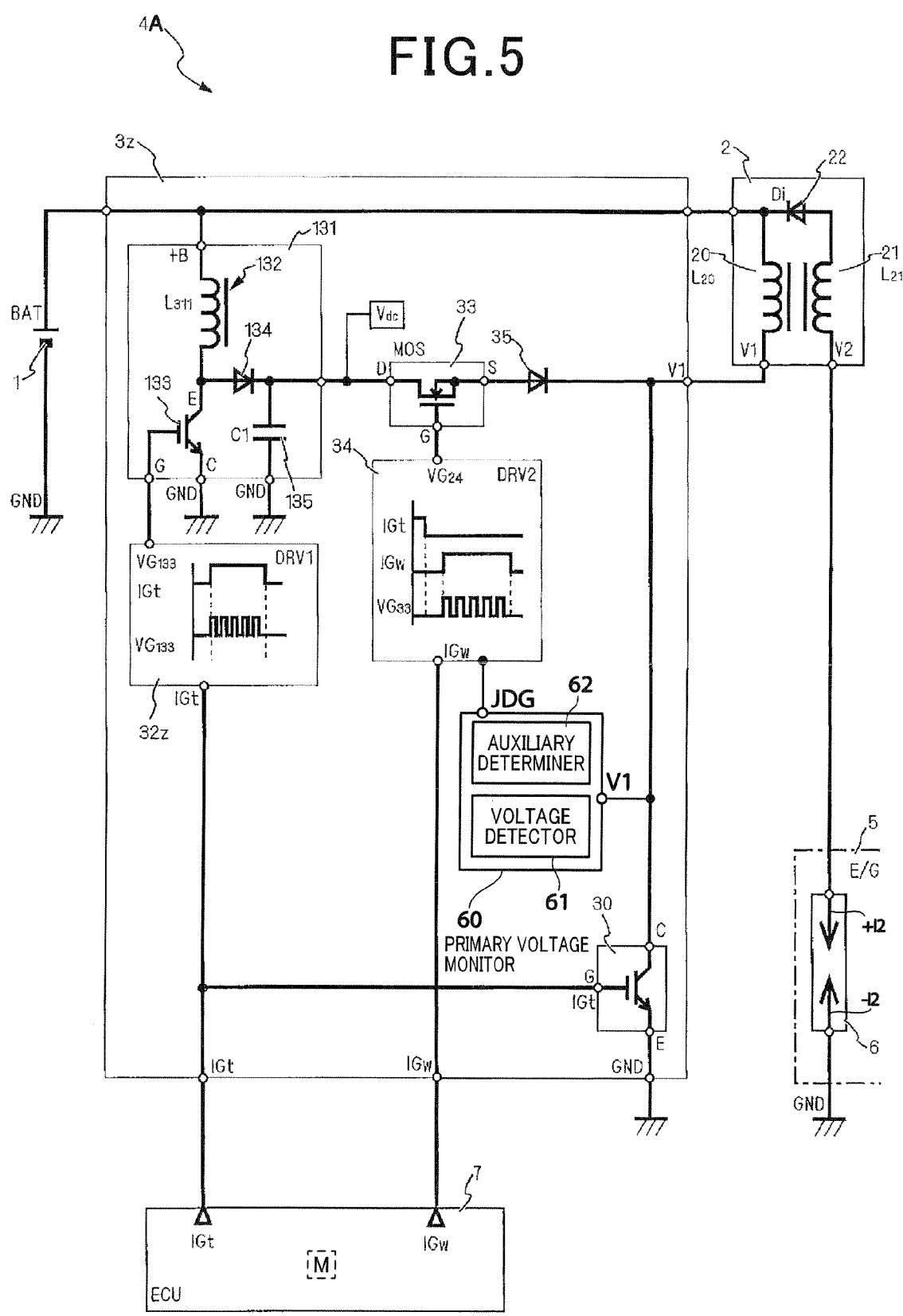
FIG. 5 is a diagram schematically illustrating an electrical structure of an ignition apparatus according to the second embodiment of the present disclosure.

Next, FIG. 3 illustrates the schematic structure of an ignition apparatus 4z as a comparative example of the ignition apparatus 4 according to the first embodiment. FIG. 4 illustrates operations of the ignition apparatus 4z.

Note that the descriptions of like parts between the first embodiment and the comparative example, to which identical reference characters are assigned, are omitted. To each of the parts of the comparative example differing from those of the first embodiment, a branch characteristic of z is added. The following describes mainly the different points of the comparative example from the first embodiment.

Referring to FIG. 3, the ignition apparatus 4z of the comparative example includes only the first auxiliary power supply 131 without including both the first and second auxiliary power supplies 131 and 231. The control circuit 3z therefore includes no power-supply selection switch 38, so that the output of the first auxiliary power supply 131 is directly connected to the discharge switch 33.

The charge driver 32z of the control circuit 3z generates a pulsed gate voltage signal, i.e. a charge signal, $VG_{133}$ having a predetermined duty cycle, i.e. an on-off cycle. The charge driver 32z opens or closes, i.e. turns on or off, the charge switch 133 according to the charge signal $VG_{133}$. The secondary voltage detector 36 is eliminated from the control circuit 3z. Note that the ignition apparatus 4z can use any one of the series-connected rectifying elements 134.

The following describes basic operations of the ignition apparatus 4z of the comparative example and points of the ignition apparatus 4z, which should be improved, with reference to FIG. 4.

(a), (b), (c), (d), (e), (f), (g), (h), and (i) in FIG. 4 respectively correspond to (a), (b), (c), (e), (f), (h), (k), (l), and (m) in FIG. 2. Note that (c) of FIG. 4 illustrates merely a charge signal $VG_{133}$, and (f) of FIG. 4 merely illustrates an auxiliary voltage Vd.

The comparative example uses only the first auxiliary power supply 131 without using the second auxiliary power supply 231 set forth above, and the charge driver 32z opens or closes the first charge switch 133 of the first auxiliary power supply 131. The following comparative example therefore describes the first auxiliary power supply 131, the first charge switch 133, and the first capacitor 135 merely as the respective auxiliary power supply 131, the charge switch 133, and the capacitor 135. The first auxiliary voltage Vdc1 will be referred to as an auxiliary voltage Vdc.

Specifically, the charge switch 133 of the comparative example is opened or closed according to the ignition signal IGt during the on period of the ignition signal IGt, so that the capacitor 135 is charged to have the high auxiliary voltage Vdc therein (see time t11 to time t12). Turning off the ignition switch 30 in synchronization with the falling edge of the ignition signal IGt causes a high secondary voltage V2 to be generated in the secondary coil 21 of the ignition coil 2, and the secondary voltage V2 is applied to the spark plug 6. This generates a spark discharge, i.e. an arc discharge, between the discharge electrodes of the spark plug 6, so that a large secondary current I2 is flowing instantly via the secondary coil 21 at time t12 (see (m) of FIG. 4). Open and close operations of the discharge switch 33, which begin in synchronization with the rising edge of the energy-application period signal IGw (see time t13), cause the auxiliary voltage Vdc discharged as the electrical energy from the capacitor 135 to be applied to the primary coil 20 from the negative side thereof. This results in the secondary voltage V2 to be kept at a level that maintains a discharge in the spark plug 6. These operations are similar to those by the ignition apparatus 4 of the first embodiment.

The control circuit 3z of the ignition apparatus 4z according to the comparative example includes no second auxiliary power supply 231. Thus, a strong airflow in the combustion chamber with the discharge switch 33 opened, i.e. turned off, enlarges an arc discharge generated in the spark plug 6, so that the secondary voltage V2 increases as illustrated in (h) of FIG. 4. As illustrated in (g) of FIG. 4, the estimated value V2/N of the generated primary voltage V1 increases in proportion to the increase of the secondary voltage V2.

This results in the generated primary voltage V1 becoming higher than the auxiliary voltage Vdc of the auxiliary power supply 131 while the discharge switch 33 is opened as illustrated in (l) of FIG. 4 (see time t14).

Even if the discharge switch 33 is closed in this state, it is difficult to cause a primary current to flow from the auxiliary power supply 131 to the primary coil 20 because the auxiliary voltage Vdc1 from the capacitor 133 is lower than the generated primary voltage V2/N.

This results in discharging of electrical energy from the secondary coil 21. This reduces the secondary voltage V2, thus reducing the primary voltage V1. As a result, application of electrical energy from the auxiliary power supply 131 to the ignition coil 2 is stopped until the primary voltage V1 becomes lower than the auxiliary voltage Vdc1 from the auxiliary power supply 131.

This may cause the arc discharge to be blown off because of the interruption of the discharge path from the auxiliary power supply 131 to the ignition coil 2, i.e. the spark plug 6, even if discharging is enabled from the auxiliary power supply 131 to the ignition coil 2. This results in waste of electrical energy applied to the spark plug 6 based on discharging from the auxiliary power supply 131 after the discharge path, which has been interrupted once, is established again. In other words, the applied electrical energy is unused to grow a flame kernel, resulting in misfire.

Even if open and close of the discharge switch 33 is carried out during an A period illustrated in (e) of FIG. 4, non-establishment of the discharge path between the auxiliary power supply 131 and the ignition coil 2, i.e. in the spark plug 6, prevents the auxiliary power supply 131 from discharging electrical power.

However, the aforementioned ignition apparatus 4 according to the first embodiment measures the secondary voltage V2 induced across the secondary coil 21 of the ignition coil 2, and compares the measured secondary voltage V2 with the threshold voltage Vth. The ignition apparatus 4 estimates the condition of the voltage across the primary coil 20 according to the compared results. Then, upon determining, based on the estimation, that application of electrical energy from one of the first and second auxiliary power supplies to the primary coil 20 is not continued, the ignition apparatus 4 switches the electrical-energy source from one of the first and second auxiliary power supplies to the other thereof.

This switching enables electrical energy to be continuously applied from the other of the first and second auxiliary power supplies to the primary coil 20 of the ignition coil 2. Continuously supplying electrical energy to the ignition coil 2 while switching between such plurality of auxiliary power supplies to the spark plug 6 enables an arc discharge generated in the spark plug 6 to be maintained. This results in fuel in the combustion chamber being stably ignited, in other words, a flame kernel based on the fuel growing stably. This improves the robustness of the ignition apparatus 4. Note that the ignition apparatus 6 according to the first embodiment can be modified accordingly within the subject matter of the present disclosure, which achieves the maintenance of the supply of electrical energy to the ignition coil.

Second Embodiment

The following describes a schematic structure of an ignition apparatus 4A according to the second embodiment of the present disclosure with reference to FIGS. 5 to 11B.

Note that descriptions of like parts between the ignition apparatus 4A and the ignition apparatus 4z as the comparative example of the first embodiment, to which like reference characters are assigned, are omitted or simplified.

Like the first embodiment, the ignition apparatus 4z is configured to superimposingly apply electrical energy output from the auxiliary power supply 131 in addition to main electrical energy from the DC power supply 1 if there is one of (1) A situation in which a strong airflow is generated in the combustion chamber (2) A situation in which misfire likely occurs due to, for example, lean combustion or age deterioration of the internal combustion engine 5.

This configuration aims to maintain a discharge in the spark plug 6.

The ignition apparatus 4A is also configured to stop the electrical energy application from the auxiliary power supply 131 to the spark plug 2 if only main electrical energy from the DC power supply 1 enables ignition of fuel in the combustion chamber to be maintained. This configuration aims to reduce the wear on the discharge electrodes of the spark plug 6 while reducing power consumption.

To achieve the objects, the ignition apparatus 4A according to the second embodiment further includes a primary voltage monitor 60 in addition to the structure of the ignition apparatus 4z according to the comparative example.

The primary voltage monitor 60 includes a primary voltage detector 61 and an auxiliary determiner 62.

The primary voltage detector 61 is connected to the electrical path between the second end of the primary coil 20 and the ignition switch. The primary voltage monitor 61 has a function of detecting the primary voltage V1 in the ignition coil 2 after the start of a discharge in the spark plug 6.

The auxiliary determiner 62 has a function of determining whether activation of the first auxiliary power supply 131 is necessary according to the primary voltage V1 measured by and fed back from the primary voltage detector 61.

Specifically, the auxiliary determiner 62 determines that activation of the first auxiliary power supply 131 is unnecessary upon the primary voltage V1 across the primary coil 20 being equal to or lower than a predetermined threshold voltage Vref. Otherwise, the auxiliary determiner 62 determines that activation of the first auxiliary power supply 131 is necessary upon the primary voltage V1 across the primary coil 20 being higher than the predetermined threshold voltage Vref, thus outputting a determination signal JDG to the discharge driver 34.

In particular, the structure of the selection determiner 37 described in the first embodiment, i.e. the structure including a comparator, can be utilized for the primary voltage monitor 60.

Specifically, the discharge driver 34 of the second embodiment determines whether to activate the auxiliary power supply 131 to apply electrical energy to the ignition coil 2 according to the determination signal JDG sent from the primary voltage monitor 60 and the energy-application period signal IGw sent from the ECU 7. This determination achieves energy-efficient discharge control in the spark plug 6.

Figure 6:
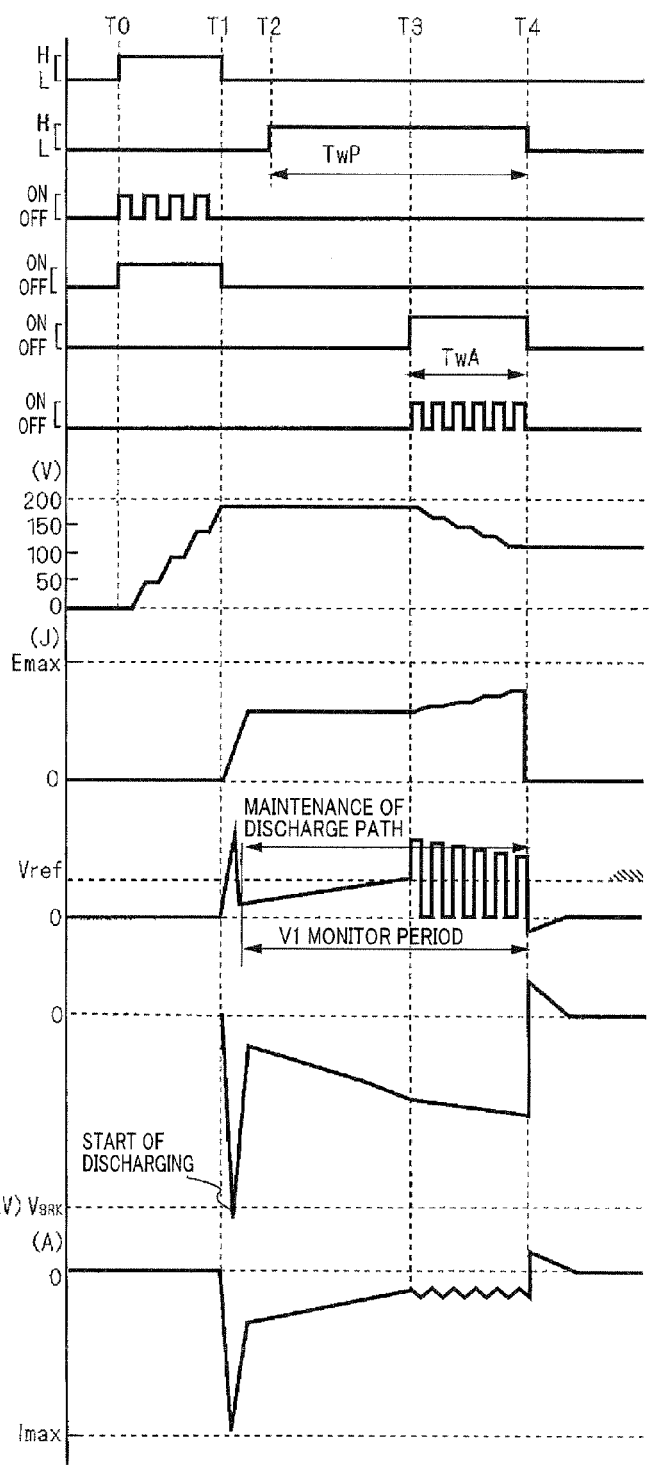
FIG. 6 is a timing chart illustrating operations of the ignition apparatus illustrated in FIG. 5 if there is a weak airflow in a combustion chamber as a first situation.
Figure 10A:
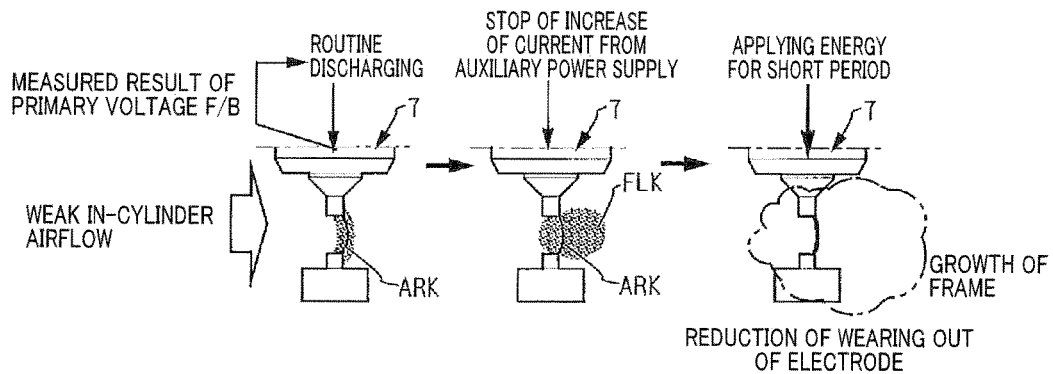
FIG. 10A is a schematic diagram illustrating an advantage of reducing the wearing out of electrodes on the basis of the operations of the ignition apparatus under the first situation.

The following describes operations and achieved advantages of the ignition apparatus 4A if there is a weak airflow in the combustion chamber as the first situation with reference to FIGS. 6 and 10A.

(a) of FIG. 6 illustrates the ignition signal IGt sent from the ECU 7, and (b) of FIG. 6 illustrates the energy-application period signal IGw. (c) of FIG. 6 illustrates how the charge switch 133 is opened or closed, i.e. turned off or on, and (d) of FIG. 6 illustrates how the ignition switch 30 is opened or closed, i.e. turned off or on. (e) of FIG. 6 illustrates how the determination signal JDG changes, and (f) of FIG. 6 illustrates how the discharge switch 33 is opened or closed, i.e. turned off or on.

(g) of FIG. 6 illustrates how the first auxiliary voltage Vdc1 changes, and (h) of FIG. 6 illustrates how the electrical energy E applied to the spark plug 6 cumulatively changes. (i) of FIG. 6 illustrates how the primary voltage V1 measured by the primary voltage monitor 60 changes, and (j) of FIG. 6 illustrates how the secondary voltage V2=NV1 induced across the secondary coil 21, which is estimated based on the primary voltage V1, changes where N represents the turn ratio. (k) of FIG. 6 illustrates how the secondary current I2 flowing through the secondary coil 21 changes.

(a) of FIG. 6 illustrates that the ignition signal IGt according to the ignition timing of the internal combustion engine 5 is sent from the ECU 7 to the charge driver 32 and the ignition switch 30 (see time T0). For example, the ignition signal IGt, which is a pulse signal having a width matching with the ignition timing and the ignition period, is sent from the ECU 7 to the charge driver 32 and the ignition switch 30.

(c) of FIG. 6 illustrates that the charge driver 32 outputs, to the charge switch 133, the charge signal $VG_{133}$ having the predetermined on-off cycle in response to, i.e. in synchronization with, the rising edge of the ignition signal IGt. This results in start of charging of the capacitor 135 in response to the rising edge of the ignition signal IGt.

The open and close operations, i.e. the on and off operations, of the charge switch 133 according to the ignition signal IGt with the discharge switch 33 opened, i.e. off, cause electrical energy stored in the choke coil 132 from the DC power supply 1 to be repeatedly charged in the capacitor 135 (see (g) of FIG. 6). This results in the boosting of the first auxiliary voltage Vdc1 from the first power supply 131 up to the upper limit voltage of, for example, 200 V. Specifically, the first and second auxiliary power supplies 131 and 231 respectively serves as DC converters, i.e. booster converters.

In addition, the ignition switch 30 is turned on, i.e. closed, in synchronization with the rising edge of the ignition signal IGt (see the time T0), and the ignition switch 30 is turned off, i.e. opened, in synchronization with the falling edge of the ignition signal IGt (see time T1).

The opening, i.e. turn-off, of the ignition switch 30 interrupts the primary current flowing through the primary coil 20, causing self-induction to generate induced electromotive force, i.e. a primary voltage, V1 across the primary coil 20 as illustrated in (i) of FIG. 6. Thus, mutual induction generates induced electromotive force, i.e. a much higher secondary voltage, V2 within, for example, the range from −20 kV to −50 kV inclusive across the secondary coil 21, which shares the core with the primary coil 20 as illustrated in (j) of FIG. 6. At that time, the secondary voltage V2 is N times higher than the primary voltage V1 where N is equal to N2/N1.

The secondary voltage V2 generated set forth above is applied to the positive discharge electrode of the spark plug 6. This results in a spark discharge, i.e. an arc discharge, between the discharge electrodes of the spark plug 6 when the secondary voltage V2 is greater than a predetermined withstand voltage in the discharge space between the discharge electrodes of the spark plug 6. Thus, a large secondary current I2 is flowing instantaneously via the secondary coil 21 (see (k) of FIG. 6).

The start of discharging from the spark plug 6 reduces the secondary voltage V2, resulting in the primary voltage V1, which is one-Nth of the secondary voltage V2 where N is the turn ratio, rapidly falling down.

Thereafter, the secondary voltage V2 increases with the extension of the arc discharge generated in the spark plug 6 due to the airflow in the combustion chamber, resulting in the primary voltage V1 gradually increasing according to the increase of the secondary voltage V2 (see (i) of FIG. 6).

On the other hand, like the first embodiment, (b) of FIG. 6 illustrates that the ECU 7 sends, in accordance with the prepared map M, the energy-application period signal IGw to the discharge driver 34 according to the operating conditions of the internal combustion engine 5 after, for example, the end timing of the ignition signal IGt (see time T2). The energy-application period signal IGw has a pulse width matching with a predetermined period; the pulse width is referred to as a scheduled energy-application period TwP.

In view of this point, there may be cases where it is unnecessary for an ignition task of an actual internal combustion engine 5 to apply electrical energy to the ignition coil 2 in accordance with the prepared map M due to individual differences of the ignition apparatuses 4A for example including (1) Variations in the ignition apparatuses 4A themselves
(2) Age deterioration of the ignition apparatuses 4A
(3) Differences of the environments of the ignition apparatuses 4A being used.

For example, FIG. 10A illustrates that a weak airflow, i.e. a weak in-cylinder airflow, in the combustion chamber fails to extend an arc discharge (ARC) even if the arc discharge is generated in the spark plug 6 based on the main electrical energy being only applied from the DC power supply 1 to the spark plug 6. Note that the measured result of the fed-back primary voltage V1 is represented as the reference character "F/B", and the flame kernel based on the burned fuel, i.e. the burned air-fuel mixture, is represented as the reference character FLK. This results in a gradual increase of the secondary voltage V2 after the start of discharging, and therefore in a gradual increase of the primary voltage V1 corresponding to one-Nth of the secondary voltage V2 where N is the turn ratio. This makes it possible to determine that the flame kernel FLK in the combustion chamber is unlikely to be blown off. Thus, even if electrical energy is applied from the auxiliary power supply 131 to the ignition coil 2 for only a short period by means of the delay of the electrical energy application, it is possible to determine that stable ignition of the fuel is occurring.

The following further provides, step by step, further detailed descriptions of the operations of the ignition apparatus 4A in the first situation.

The primary voltage monitor 6 is monitoring the primary voltage V1 induced across the primary coil 41 after the start of discharging in the spark plug 6.

The correlations between change in the secondary voltage V2 and change in the primary voltage V1 set forth above enable monitoring of the change in the primary voltage V1 to predict the change in the secondary voltage V2.

(i) of FIG. 6 shows that the auxiliary determiner 62 determines that it is unnecessary to apply electrical energy from the auxiliary power supply 131 to the ignition coil 2 until the primary voltage V1 monitored by the primary voltage detector 61 has reached the predetermined threshold voltage Vref even if the energy energy-application period signal IGw is the high level. This results in a normal discharging state, i.e. a discharging state based on the DC voltage +B supplied from the DC power supply 1, being maintained.

On the other hand, (e) of FIG. 6 shows that the determination signal JDG is sent from the auxiliary determiner 62 to the discharge driver 34 upon the primary voltage V1 monitored by the primary voltage detector 61 exceeding the predetermined threshold voltage Vref. In other words, the determination signal JDG sent from the auxiliary determiner 62 to the discharge driver 34 changes from an off level to an on level (see time T3). This results in the discharge driver 34 opening or closing the discharge switch 33 according to the predetermined duty cycle, i.e. on-off cycle, during an energy application period TwA. Note that the energy application period TwA can be determined based on, for example, the application timing, i.e. the time T3, and the falling edge of the scheduled energy-application period TwP.

Open and close operations of the discharge switch 33 cause the auxiliary voltage Vdc according to the voltage charged in the capacitor 135 of the auxiliary voltage 131 to be applied to the primary coil 20 from the negative side thereof (see (g) of FIG. 6). This enables the auxiliary voltage Vdc to be superimposingly applied to the primary coil 20 in addition to the DC voltage +B from the DC power supply 1. This causes the primary current to continuously flow through the primary coil 20 (see the time T3 and thereafter), resulting in the secondary current I2 continuously flowing according to the primary current.

Note that the waveform of the primary voltage V1 changes like a pulse between 0 V and the auxiliary voltage Vdc inclusive after the start of discharging. This is because the primary voltage V1 becomes the auxiliary voltage Vdc when the discharge switch 33 is on, and decreases due to discharging via a parasitic diode of the ignition switch 30 when the discharge switch 33 is off.

Consequently, (i) of FIG. 6 shows that application of the secondary current I2 to the spark plug 6 prevents an increase of the discharged voltage, i.e. the secondary voltage V2, even if the primary voltage V1 is higher than the threshold voltage Vref. This results in an arc discharge generated in the spark plug 6 being maintained without being interrupted (see (j) and (k) of FIG. 6).

The aforementioned ignition apparatus 4A according to the second embodiment reduces the actual energy application period TwA to the ignition coil 2 as compared with the predetermined scheduled energy-application period TwP under the first situation where there is a weak airflow in the combustion chamber. This results in reduction of power in the spark plug 6, thus reducing the load of the DC power supply 10 and improving energy efficiency.

Stopping excessive electrical-energy application to the spark plug 6 enables reduction of the wearing out of the discharge electrodes of the spark plug 6.

Figure 10B:
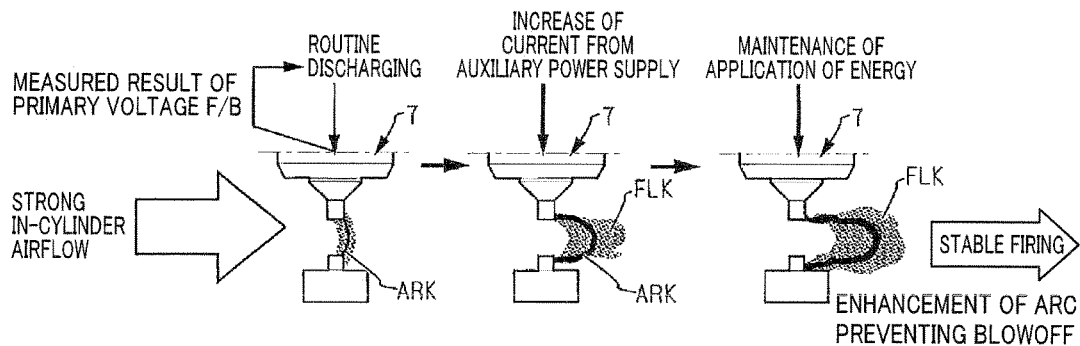
FIG. 10B is a schematic diagram illustrating a blowoff reduction advantage on the basis of the operations of the ignition apparatus under the second situation.

Next, the following describes operations and achieved advantages of the ignition apparatus 4A if there is a strong airflow in the combustion chamber as the second situation with reference to FIGS. 7 and 10B.

Descriptions of operations of the ignition apparatus 4A under the second situation, which are substantially identical to those of the ignition apparatus 4A under the first situation, are omitted, and therefore the following describes specific distinctive operations of the ignition apparatus 4A under the second situation.

The parameters illustrated in the (a) to (k) of FIG. 7 are the same as the respective parameters illustrated in the corresponding (a) to (k) of FIG. 6.

FIG. 10B illustrates that a strong airflow, i.e. a strong in-cylinder airflow, in the combustion chamber causes an arc discharge to extend. This results in an earlier increase in the secondary voltage V2.

The correlations between change in the secondary voltage V2 and change in the primary voltage V1 set forth above enable monitoring of the change in the primary voltage V1 to predict the change in the secondary voltage V2, i.e., predict blowoff of the discharge generated in the spark plug 6.

Specifically, (i) of FIG. 7 shows that the determination signal JDG is sent from the auxiliary determiner 62 to the discharge driver 34 upon the primary voltage V1 monitored by the primary voltage detector 61 exceeding earlier the predetermined threshold voltage Vref although the energy-application period signal IGw is the low level (see (b), (e), and (f) of FIG. 7).

In other words, the determination signal JDG sent from the auxiliary determiner 62 to the discharge driver 34 changes from the off level to the on level (see time T3A). The determination signal JDG having the on level causes the discharge driver 34 to open or close the discharge switch 33 according to the predetermined duty cycle, i.e. on-off cycle (see (f) of FIG. 7). This period Tw3A of the energy application can be determined based on, for example, the time T3A and the scheduled energy-application period TwP.

Open and close operations of the discharge switch 33 cause the auxiliary voltage Vdc according to the voltage charged in the capacitor 135 of the auxiliary voltage 131 to be applied to the primary coil 20 from the negative side thereof (see (g) of FIG. 7). This enables the superimposed application of the auxiliary voltage Vdc and the DC voltage +B from the DC power supply 1 to the primary coil 20 to be carried out earlier. This enables the secondary current I2 to continuously flow (see (k) of FIG. 7) even if the primary voltage V1 increases earlier to exceed the threshold voltage Vref (see the time T3A and (i) of FIG. 7). This results in an arc discharge generated in the spark plug 6 being maintained without being interrupted (see (j) and (k) of FIG. 7).

Under the second situation where there is a strong airflow in the combustion chamber, the aforementioned ignition apparatus 4A according to the second embodiment enables sufficient electrical energy to be supplied from the auxiliary power supply 131 to the spark plug 6 even if the strong airflow works to elongate an arc discharge (see FIG. 10B). This prevents blowoff of the arc discharge due to the in-cylinder airflow, thus achieving stable ignition of the fuel in the combustion chamber.

Figure 11A:
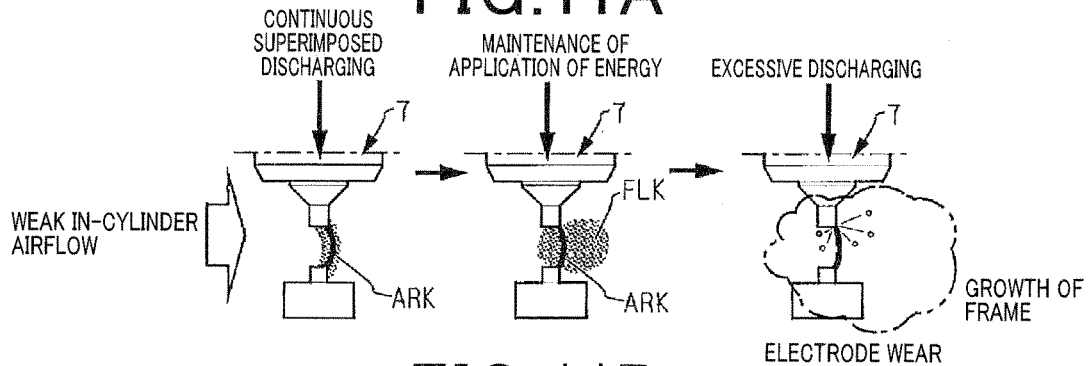
FIG. 11A is a schematic diagram illustrating the wearing out of electrodes due to the operations of the ignition apparatus according to the first comparison example.

The following describes operations of an ignition apparatus according to a first comparative example of the ignition apparatus 4A according to the second embodiment with reference to FIGS. 8 and 11A. Note that the ignition apparatus according to the first comparative example differs from the ignition apparatus 4A according to the first embodiment in the following points. Specifically, the ignition apparatus according to the first comparative example is configured to (1) Fail the feedback of the monitored result of the primary voltage V1 by the primary voltage monitor 60 to the discharge driver 34

(2) Continuously activate the auxiliary power supply 131 immediately after the start of discharging in the spark plug 6 while there is no strong airflow in the combustion chamber.

Descriptions of operations of the ignition apparatus according to the first comparative example, which are substantially identical to those of the ignition apparatus 4A under the first situation, are omitted, and therefore the following describes specific distinctive operations of the ignition apparatus according to the first comparative example.

The parameters illustrated in the (a) to (k) of FIG. 8 are the same as the respective parameters illustrated in the corresponding (a) to (k) of FIG. 6.

The first comparative example has the determination signal JDG, which is forcibly maintained at the on level (see (e) of FIG. 8). This causes electrical energy from the auxiliary power supply 131 to be applied to the ignition coil 2 even if the primary voltage V1 is equal to or lower than the threshold voltage Vref after the start of discharging in the spark plug 6 (see (i) of FIG. 8 and time T2A). That is, the primary voltage V1 higher than the threshold voltage Vref results in a discharge being estimated to blow off. An excessive discharge in the spark plug 6 is therefore continuously maintained as illustrated in FIG. 11A. The excessive discharge may result in the wearing out of the discharge electrodes of the spark plug 6.

In view of this point, it is possible to employ a method of monitoring the power-supply voltage from the DC power supply 1, thus averaging a voltage applied to the spark plug 6. This method can maintain, even if it is difficult to maintain a discharge generated in the spark plug 6, the discharge. Unfortunately, the method may cause the wearing out of the discharge electrodes of the spark plug 6 due to excessive electrical energy application to the spark plug 6 if there is no strong airflow in the combustion chamber, i.e. if the fuel is likely already ignited.

Figure 11B:
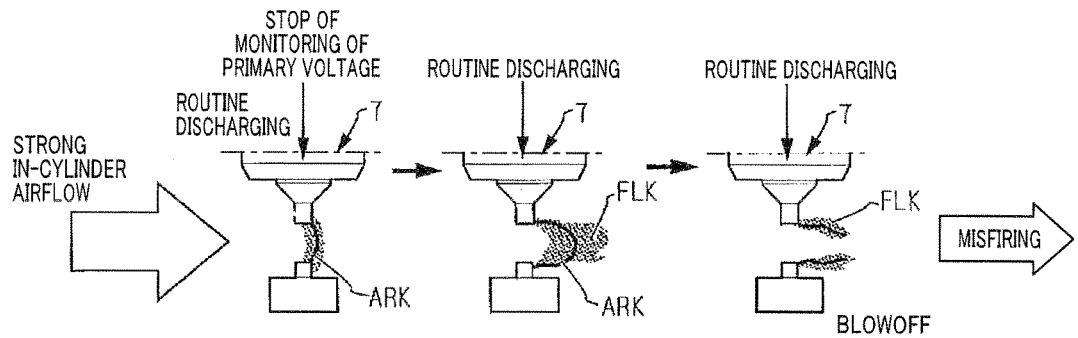
FIG. 11B is a schematic diagram illustrating blowoff due to the operations of the ignition apparatus according to the second comparison example.

Next, the following describes operations of an ignition apparatus according to a second comparative example of the ignition apparatus 4A according to the second embodiment with reference to FIGS. 9 and 11B. Note that the ignition apparatus according to the second comparative example differs from the ignition apparatus 4A according to the first embodiment in the following points. Specifically, the ignition apparatus according to the second comparative example is configured to perform an ignition test using the spark plug 6 in the situation where there is a strong airflow in the combustion chamber while the auxiliary power supply 131 is forcibly shut down. FIG. 9 illustrates operations of the ignition apparatus according to the second comparative example during the ignition test.

Descriptions of operations of the ignition apparatus according to the second comparative example, which are substantially identical to those of the ignition apparatus 4A under the second situation, are omitted, and therefore the following describes specific distinctive operations of the ignition apparatus according to the second comparative example.

The parameters illustrated in the (a) to (k) of FIG. 9 are the same as the respective parameters illustrated in the corresponding (a) to (k) of FIG. 7.

The second comparative example has the determination signal JDG, which is forcibly maintained at the off level (see (e) of FIG. 9). This prevents the monitored result of the primary voltage V1 by the primary voltage monitor 60 from being fed back to the discharge driver 34.

The open and close operations of the charge switch 133 according to the ignition signal IGt cause a high secondary voltage V2 to be generated across the secondary coil 21 of the spark plug 6. The secondary voltage V2 is applied to the spark plug 6, thus generating an arc discharge between the discharge electrodes of the spark plug 6 like the second embodiment.

The second comparative example 2 is configured such that the auxiliary power supply 131 is forcibly deactivated. This configuration causes a strong airflow in the combustion chamber to elongate the arc discharge as illustrated in FIG. 11B. The elongated arc discharge relatively expands the discharge distance, resulting in an increase of the secondary voltage V2. The increase of the secondary voltage V2 causes the primary voltage V1 to become greater than the predetermined threshold voltage Vref, making it difficult to maintain the discharge in the spark plug 6. This results in the arc discharge being detached and therefore blown off (see (j) and (k) of FIG. 9 and FIG. 11B).

The blowoff disables the secondary current I2 from instantaneously flowing. This looks like as if the interruption of the supply of the secondary current I2 by switching takes place, thus starting pseudo discharging in the spark plug 6 again.

This causes electrical energy supplied to the spark plug 6 to be consumed in an electrical breakdown in the discharge space between the discharge electrodes of the spark plug 6. In other words, the supplied electrical energy has little contribute to the growth of the flame. This cause the flame kernel FLK being blown off, resulting in misfire.

In contrast, the ignition apparatus 4A according to the second embodiment reduces power consumption in the spark plug 6 under the first situation where there is a weak airflow in the combustion chamber, thus achieving improvement of energy efficiency and reducing the wearing out of the discharge electrodes of the spark plug 6. Additionally, the ignition apparatus 4A according to the second embodiment prevents blowoff of the arc discharge due to the in-cylinder airflow, thus achieving stable ignition of the fuel in the combustion chamber.

Accordingly, the ignition apparatus 4A according to the second embodiment has the superior advantages as compared with the first and second comparison examples.

Third Embodiment

Figure 12:
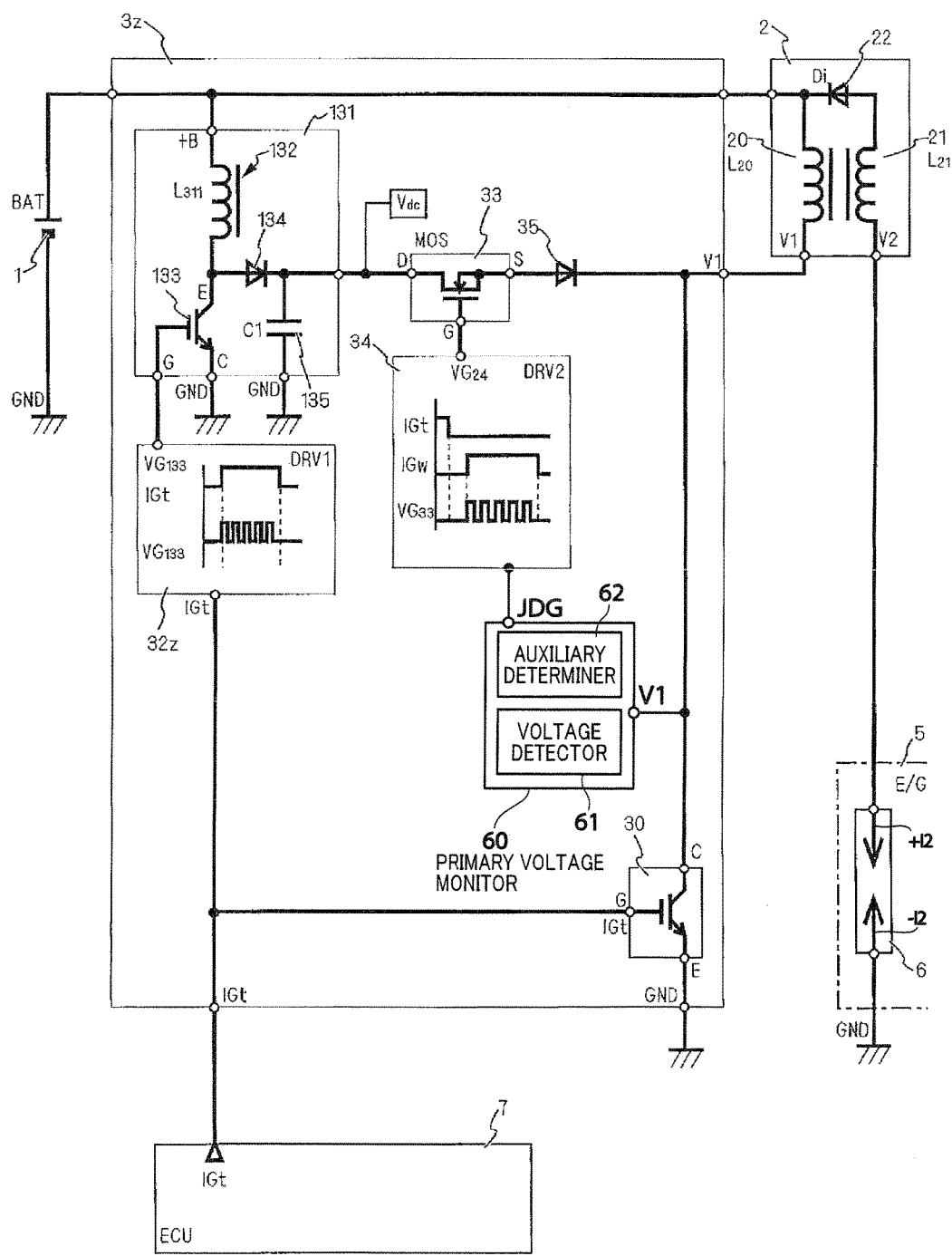
FIG. 12 a diagram schematically illustrating an electrical structure of an ignition apparatus according to the third embodiment of the present disclosure.
Figure 13:
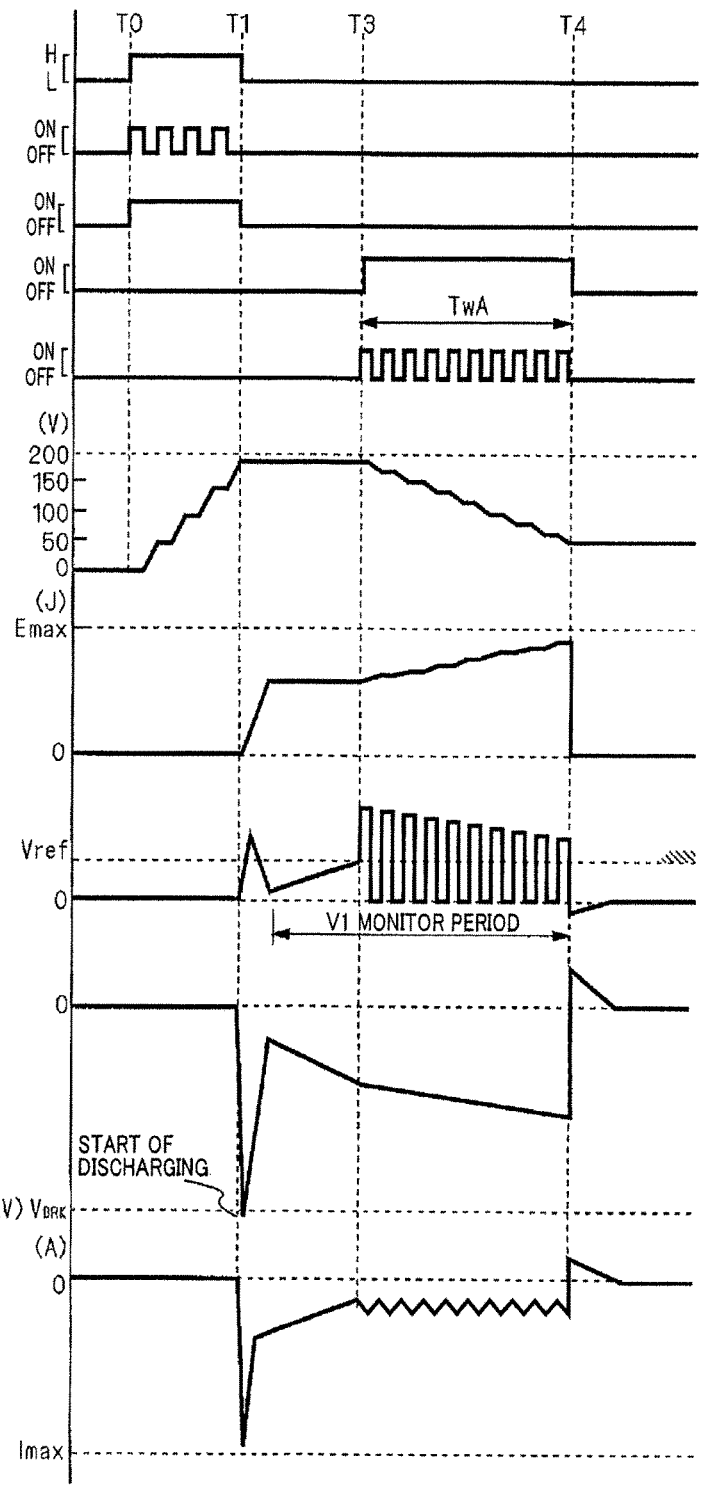
FIG. 13 is a timing chart illustrating operations of the ignition apparatus illustrated in FIG. 12.

The following describes a schematic structure of an ignition apparatus 4B according to the third embodiment of the present disclosure with reference to FIGS. 12 and 13.

Note that descriptions of like parts between the ignition apparatus 4B according to the third embodiment and the ignition apparatus 4A according to the second embodiment, to which like reference characters are assigned, are omitted or simplified.

The ignition apparatus 4A according to the second embodiment determines, according to the operating conditions of the internal combustion engine 5, the energy-application period signal IGw including a standard scheduled energy-application period TwP and an energy application timing. The ignition apparatus 4A also compares the monitored result of the actual primary voltage V1 with the threshold voltage Vref. The ignition apparatus 4A is configured to determine, according to the results of the comparison and the determined energy-application period signal IGw, an actual activation timing and an actual activation period of the auxiliary power supply 131, i.e. an actual energy application period TwA and an actual energy application timing to the ignition coil 2. This configuration enables improvement of ignition of the fuel in the combustion chamber, power saving of the ignition apparatus 4A, and improvement of the durability of the spark plug 6.

In contrast, the ignition apparatus 4B according to the second embodiment is configured to determine an actual activation timing and an actual activation period of the auxiliary power supply 131, i.e. an actual energy application period TwA and an actual energy application timing to the ignition coil 2 without using the energy-application period signal IGw.

Specifically, referring to FIG. 12, the ignition apparatus 4B is configured such that the connection line between the ECU 7 and the discharge driver 34 is eliminated. The remaining structure of the ignition apparatus 4B is substantially identical to the corresponding structure of the ignition apparatus 4A.

In particular, the primary voltage detector 61 of the primary voltage monitor 60 compares the primary voltage V1 of the ignition coil 4 with the threshold voltage Vref. The auxiliary determiner 62 determines, according to the compared results, that application of electrical energy from the auxiliary power supply 131 to the ignition coil 2 is necessary upon the primary voltage V1 being higher than the predetermined threshold voltage Vref, thus outputting a determination signal JDG to the discharge driver 34. At that time, the discharge driver 34 uses the determination signal JDG directly as a signal for determining an activation timing and activation period of the discharge switch 33.

FIG. 13 illustrates operations of the ignition apparatus 4B under the second situation. Note that the parameters illustrated in the respective (a) and (c) to (k) of FIG. 13 are identical to the corresponding parameters illustrated in the respective (a) and (c) to (k) of FIG. 7.

Change of each of the parameters illustrated in the (a) and (c) to (k) of FIG. 13 is substantially identical to change of a corresponding one of the parameters illustrated in the (a) and (c) to (k) of FIG. 7. Thus, the ignition apparatus 4B according to the third embodiment is capable of performing ignition control that is substantially identical to the aforementioned ignition control carried out by the ignition apparatus 4A according to the second embodiment. This enables the ignition apparatus 4B according to the third embodiment to achieve the advantages that are substantially identical to the advantages achieved by the ignition apparatus 4A.

Note that the ignition apparatus 4B according to the third embodiment determines an energy application timing and an energy application period from the auxiliary power supply 131 to the ignition coil 2 using only the determination signal JDG. This makes it necessary for the ignition apparatus 4B to address the chattering of, for example, the discharge switch 33.

In contrast, the ignition apparatus 4A according to the second embodiment determines an energy application timing and an energy application period from the auxiliary power supply 131 to the ignition coil 2 using the combination of the energy-application period signal IGw and the determination signal JDG. This enables reduction of the influence of the chattering of, for example, the discharge switch 33, thus achieving more stable firing of the fuel in the combustion chamber.

Note that the present disclosure is not limited to the above first to third embodiments. The first to third embodiments can be modified accordingly within the present disclosure.

Like the second embodiment, the ignition apparatus 4 according to the first embodiment can determine, according to the results of the comparison between the secondary voltage V2 measured by the secondary voltage detector 36 and a threshold voltage Vref1, an actual activation timing and an actual activation period of the auxiliary power supply 131, i.e. an actual energy application period TwA and an actual energy application timing to the ignition coil 2. Converting the threshold voltage Vref matching with the primary voltage V1 into a threshold voltage matching with the secondary voltage V2 enables the threshold voltage Vref2 of this modification to be obtained.

Figure 14:
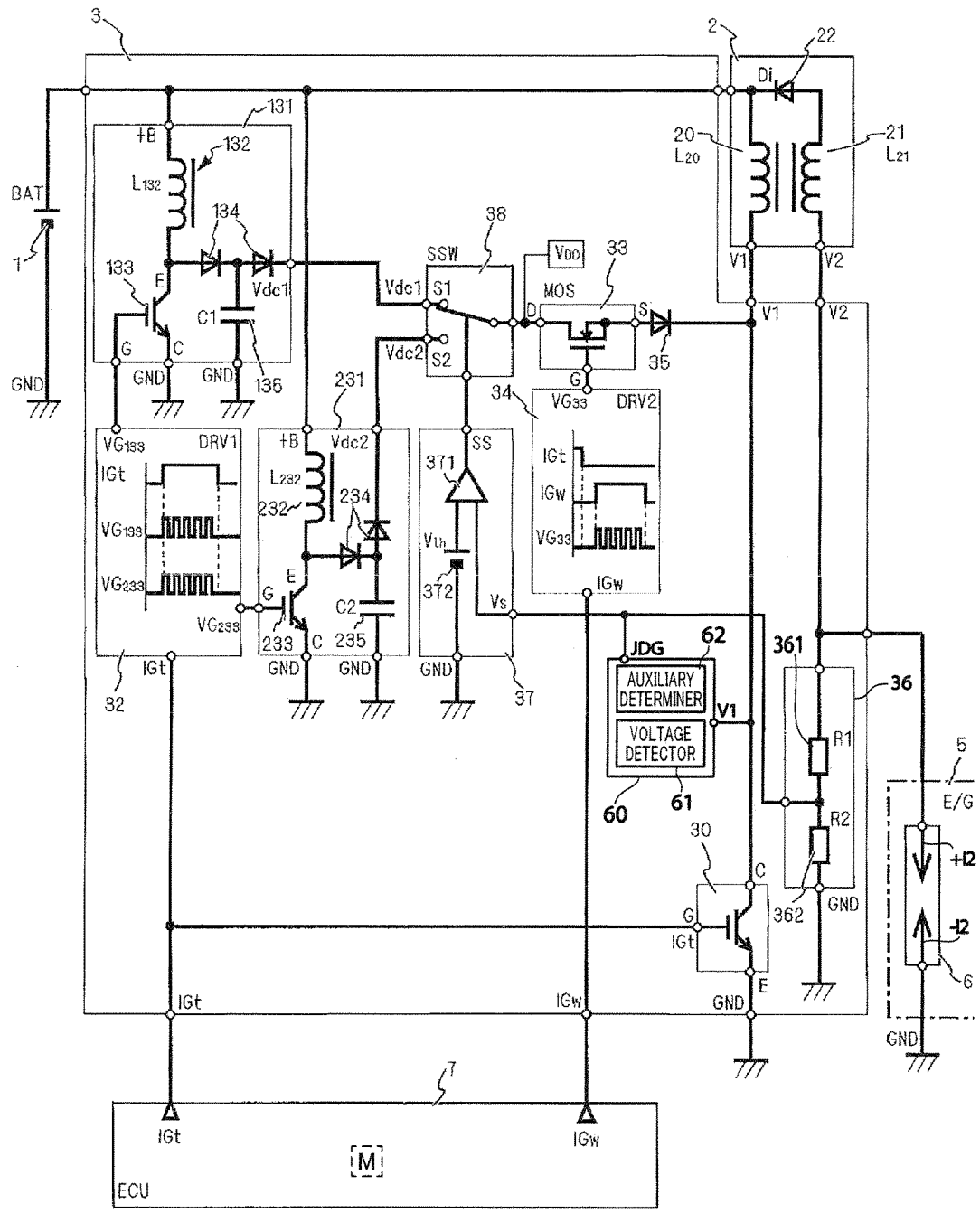
FIG. 14 is a diagram schematically illustrating an electrical structure of an ignition apparatus that includes both features of the ignition apparatus according to the first embodiment and features of the ignition apparatus according to the second embodiment.

It is possible to combine the features of the ignition apparatus 4 of the first embodiment with the features of the ignition apparatus 4A of the second embodiment. FIG. 14 illustrates a schematic structure of an ignition apparatus 4C constructed based on the combination.

Specifically, the ignition apparatus 4C illustrated in FIG. 14 includes the primary voltage detector 61 connected to the electrical path between the second end of the primary coil 20 and the ignition switch.

The ignition apparatus 4C configured above carries out the first task of switching between the auxiliary power supplies according to the first embodiment and the second task of controlling activation of the auxiliary power supplies according to the second embodiment.

The first task is configured to switch one of the first and second auxiliary power supplies, which actually supplies electrical energy to the primary coil 20, to the other thereof. The first task carries out the switching upon determining, according to the compared results between the measured secondary voltage V2 and the threshold voltage Vth, that it is difficult to continuously supply electrical energy from one of the first and second auxiliary power to the primary coil 20.

The second task is configured to determine an actual activation timing and an actual activation period of the auxiliary power supply 131 according to the compared results between the monitored primary voltage V1 and the threshold voltage Vref.

The ignition apparatus 4 according to the first embodiment determines, according to the compared results between the measured secondary voltage V2 and the threshold voltage Vth, whether it is difficult to continuously supply electrical energy from one of the first and second auxiliary power to the primary coil 20, which actually supplies electrical energy to the primary coil 20. The ignition apparatus 4 switches one of the first and second auxiliary power supplies to the other thereof upon determining that it is difficult to continuously supply electrical energy from one of the first and second auxiliary power to the primary coil 20. The present disclosure is however not limited to the configuration.

Specifically, the power-supply selecting switch 38 of the ignition apparatus 4 of the first embodiment is configured to switch the connection to the output terminal thereof from the first input terminal S1 to the second input terminal S2 when the switching signal SS is output thereto. The concept of this configuration aims to switch the level Vdc1 of electrical energy to be applied from the first auxiliary power supply 131 to the primary coil 20 to the level Vdc2 exceeding the primary voltage V1. The concept of this configuration performs this switching upon determining that the switching signal SS is output to the switch 38, i.e., that the level Vdc1 of the electrical energy to be applied from the first auxiliary power supply 131 to the primary coil 20 become lower than the primary voltage V1.

Thus, the present disclosure is not limited to such switching between a plurality of auxiliary power supplies, and therefore can be modified to meet the concept.

The invention claimed is:

1. An ignition apparatus for igniting, via a spark plug, fuel in a combustion chamber of an internal combustion engine according to a DC voltage supplied from a DC power supply, the ignition apparatus comprising:
   an ignition coil comprising a primary coil and a secondary coil, the primary coil having one end connected to a ground terminal, the ignition coil being configured to boost the DC voltage applied to the primary coil to generate a secondary voltage across the secondary coil, and apply the secondary voltage to the spark plug as main electrical energy, thus generating a discharge in the combustion chamber;
   at least one auxiliary power supply for applying auxiliary electrical energy to the one end of the primary coil of the ignition coil, the one end of the primary coil being connected to the ground terminal;
   a voltage detector configured to detect at least one of a primary voltage generated across the primary coil and the secondary voltage;
   an adjuster circuit configured to adjust, according to at least one of the primary voltage and the secondary voltage detected by the voltage detector, at least one of an application timing and an application level of the auxiliary electrical energy to the ignition coil while the main electrical energy is applied to the spark plug by the ignition coil, the application timing including whether the auxiliary electrical energy is applied to the ignition coil wherein:

the adjuster circuit comprises:

a determiner circuit configured to compare at least one of the primary voltage and the secondary voltage detected by the voltage detector with a second threshold voltage, and determine, according to the result of the comparison, the application timing and application level of the auxiliary electrical energy to the ignition coil, the application timing including whether the auxiliary electrical energy is applied to the ignition coil, and the determiner circuit is configured to:
  determine that application of the auxiliary electrical energy to the ignition coil is unnecessary upon at least one of the primary voltage and the secondary voltage detected by the voltage detector being equal to or lower than the second threshold voltage; and
  determine that application of the auxiliary electrical energy to the ignition coil is necessary upon at least one of the primary voltage and the secondary voltage detected by the voltage detector being higher than the second threshold voltage.

2. The ignition apparatus according to claim 1, wherein:

the auxiliary power supply comprises at least first and second auxiliary power supplies that respectively output first auxiliary electrical energy and second auxiliary electrical energy as the auxiliary electrical energy; and the adjuster circuit comprises:
  a connector configured to connect the first auxiliary power supply to the one end of the primary coil of the ignition coil to apply the first auxiliary electrical energy to the one end of the primary coil in response to a start of application of the secondary voltage to the spark plug by the ignition coil; and
  a second determiner circuit configured to compare the secondary voltage detected by the voltage detector with a first threshold voltage, and determine, according to the result of the comparison, whether to switch the first auxiliary power supply connected to the one end of the primary coil via the connector to the second auxiliary power supply.

3. The ignition apparatus according to claim 2, wherein the determiner circuit is configured to:
  recognize that a level of the first auxiliary electrical energy output from the first auxiliary power supply decreases to close to the primary voltage upon obtaining, as the result of the comparison, that the secondary voltage detected by the voltage detector is higher than the first threshold voltage; and
  switch the first auxiliary power supply connected to the one end of the primary coil via the connector to the second auxiliary power supply, thus applying the second auxiliary electrical energy to the ignition coil, the second auxiliary electrical power having a level higher than an actual level of the first auxiliary electrical energy.

4. The ignition apparatus according to claim 1, wherein the at least one auxiliary power supply comprises:
  an inductor connected to the DC power supply;
  a switch for opening or closing an electrical path between the inductor and the DC power supply;
  a capacitor connected to the inductor; and
  a driver configured to turn on or off the switch according to a predetermined cycle, thus charging the capacitor via the inductor.

5. The ignition apparatus according to claim 1, wherein the adjuster circuit comprises:
  a driver for driving the at least one of the auxiliary power supply based on an energy-application period signal previously determined according to an operating condition of the internal combustion engine, the energy-application period signal including a scheduled application timing and a scheduled application period of the auxiliary electrical energy and wherein the determiner circuit is configured to:
  compare the primary voltage detected by the voltage detector with a second threshold voltage, and
  determine, based on the result of the comparison and the scheduled application timing and scheduled application period, an actual application timing and an actual application period of the auxiliary electrical energy to the ignition coil, the actual application timing including whether the auxiliary electrical energy is applied to the ignition coil.

6. The ignition apparatus according to claim 1, wherein the at least one auxiliary power supply applies the auxiliary electrical energy to the primary coil from the one end connected to the ground terminal.

\* \* \* \* \*